US010532321B2

(12) United States Patent
Takahashi

(10) Patent No.: US 10,532,321 B2
(45) Date of Patent: Jan. 14, 2020

(54) SEAWATER DESALINATION SYSTEM AND ENERGY RECOVERY DEVICE

(71) Applicant: Ebara Corporation, Tokyo (JP)

(72) Inventor: Tamami Takahashi, Tokyo (JP)

(73) Assignee: EBARA CORPORATION, Tokyo (JP)

(*) Notice: Subject to any disclaimer, the term of this patent is extended or adjusted under 35 U.S.C. 154(b) by 567 days.

(21) Appl. No.: 15/030,759

(22) PCT Filed: Oct. 22, 2014

(86) PCT No.: PCT/JP2014/078068
§ 371 (c)(1),
(2) Date: Apr. 20, 2016

(87) PCT Pub. No.: WO2015/060337
PCT Pub. Date: Apr. 30, 2015

(65) Prior Publication Data
US 2016/0250595 A1 Sep. 1, 2016

(30) Foreign Application Priority Data
Oct. 23, 2013 (JP) .................................. 2013-220044

(51) Int. Cl.
B01D 61/02 (2006.01)
B01D 61/06 (2006.01)
(Continued)

(52) U.S. Cl.
CPC ........... B01D 61/06 (2013.01); B01D 61/025 (2013.01); B01D 61/10 (2013.01); B01D 61/12 (2013.01);
(Continued)

(58) Field of Classification Search
CPC ...... B01D 61/06; B01D 61/025; B01D 61/10; B01D 61/12; B01D 2313/18;
(Continued)

(56) References Cited

U.S. PATENT DOCUMENTS

2009/0110563 A1* 4/2009 Takita .................... B01D 61/06
417/53
2012/0061309 A1* 3/2012 Takahashi ............ B01D 61/025
210/251

FOREIGN PATENT DOCUMENTS

CN 103304006 A 9/2013
JP 2005-270710 A 10/2005
(Continued)

OTHER PUBLICATIONS

Spire Metering Technology, "The buyer's guide to ultrasonic flowmeters". Jan. 10, 2013.*
(Continued)

Primary Examiner — Benjamin L LeBron
(74) Attorney, Agent, or Firm — Pearne & Gordon LLP

(57) ABSTRACT

An energy recovery device is provided in a seawater desalination system for desalinating seawater by removing salinity from the seawater. A pressure exchange chamber for pressurizing seawater by a pressure of concentrated seawater discharged from a reverse-osmosis membrane-separation apparatus includes a first supply and discharge port connected to a switching valve for performing supply and discharge of liquid, a second supply and discharge port connected to a directional control valve for performing supply and discharge of liquid, a flow resistor provided at the first supply and discharge port side in the chamber and configured to regulate the flow, and a flow resistor provided at the second supply and discharge port side in the chamber and configured to regulate the flow, and a flowmeter provided between the two flow resistors and configured to measure a flow rate of the liquid in the chamber.

14 Claims, 21 Drawing Sheets

(51) Int. Cl.
*B01D 61/10* (2006.01)
*B01D 61/12* (2006.01)
*C02F 1/00* (2006.01)
*C02F 1/44* (2006.01)
*F15B 21/14* (2006.01)
*F15D 1/02* (2006.01)
*G01F 1/42* (2006.01)
*C02F 103/08* (2006.01)

(52) U.S. Cl.
CPC .............. *C02F 1/008* (2013.01); *C02F 1/441* (2013.01); *F15B 21/14* (2013.01); *B01D 2313/18* (2013.01); *B01D 2313/19* (2013.01); *B01D 2313/246* (2013.01); *C02F 2103/08* (2013.01); *C02F 2201/005* (2013.01); *C02F 2209/40* (2013.01); *C02F 2303/10* (2013.01); *F15D 1/025* (2013.01); *G01F 1/42* (2013.01); *Y02A 20/131* (2018.01); *Y02W 10/30* (2015.05)

(58) Field of Classification Search
CPC ............ B01D 2313/19; B01D 2313/08; B01D 2313/246; C02F 1/008; C02F 1/441; C02F 2103/08; C02F 2303/10; C02F 2201/005; C02F 2209/40; Y02W 10/30; Y02A 20/131; F15B 21/14; F15D 1/025; G01F 1/42

See application file for complete search history.

(56) References Cited

FOREIGN PATENT DOCUMENTS

| JP | 2010-284642 A | 12/2010 |
|---|---|---|
| JP | 4870648 B2 | 11/2011 |
| JP | 2012-192379 A | 10/2012 |
| JP | 2013-059743 A | 4/2013 |
| JP | 2013-139012 A | 7/2013 |
| JP | 2013-184096 A | 9/2013 |

OTHER PUBLICATIONS

Thomas, "Ultrasonic flow meter measures bi-directional flows", Thomas Publishing Company. May 5, 2006.*
Guo, H., "Metallurgical Process Design", vol. 1, Design Basis, pp. 326-327, Metallurgical Industry Publisher, Jun. 2006.
International Search Report for Application No. PCT/JP2014/078068 dated Jan. 27, 2015.
Japanese Office Action in Patent Application No. JP-2015-543879 dated Apr. 17, 2018.

* cited by examiner

SEAWATER DESALINATION SYSTEM AND ENERGY RECOVERY DEVICE

TECHNICAL FIELD

The present invention relates to a seawater desalination system (seawater desalination plant) for desalinating seawater by removing salinity from the seawater while using an energy recovery device, and relates to the control of supply and discharge of seawater and concentrated seawater in the energy recovery device (ERD: Energy Recovery Device) for the seawater desalination plant, and more particularly to the control of supply and discharge of the seawater and the concentrated seawater which is preferably used in the energy recovery device (ERD) using a pressure exchange chamber having no piston.

BACKGROUND ART

Conventionally, as a system for desalinating seawater, there has been known a seawater desalination system in which seawater passes through a reverse-osmosis membrane-separation apparatus to remove salinity from the seawater. In the seawater desalination system, the intake seawater is processed to have certain water qualities by a pretreatment system, and the pretreated seawater is delivered into the reverse-osmosis membrane-separation apparatus under pressure by a high-pressure pump. Part of the high-pressure seawater in the reverse-osmosis membrane-separation apparatus passes through a reverse-osmosis membrane against the osmotic pressure and is desalinated, and fresh water (permeate or desalted water) is taken out from the reverse-osmosis membrane-separation apparatus. The remaining seawater is discharged in a concentrated state of a high salt content as a concentrated seawater (brine) from the reverse-osmosis membrane-separation apparatus. The largest operational cost in the seawater desalination system is electric power expenses, and it depends heavily on energy for pressurizing the pretreated seawater up to such a pressure to overcome the osmotic pressure, i.e. up to the reverse-osmosis pressure. That is, the operational cost of the seawater desalination system is greatly affected by pressurizing energy of the seawater by the high-pressure pump.

Specifically, more than half of the electric power expenses as the highest cost in the seawater desalination system are consumed to operate the high-pressure pump for pressurizing the seawater. Then, pressure energy possessed by the high-pressure concentrated seawater with the high salt content which has been discharged from the reverse-osmosis membrane-separation apparatus is utilized for pressurizing part of the seawater to reduce electric power. Therefore, as a means for utilizing the pressure energy of the concentrated seawater discharged from the reverse-osmosis membrane-separation apparatus to pressurize part of the seawater, there is an energy recovery device having an energy recovery chamber in which an interior of a cylinder is separated into two spaces by a piston arranged to be movable in the cylinder, a concentrated seawater port is provided in one of the two separated spaces to introduce and discharge the concentrated seawater, and a seawater port is provided in the other of the two separated spaces to introduce and discharge the seawater.

FIG. 19 is a schematic view showing a configuration example of a conventional seawater desalination system.

As shown in FIG. 19, seawater pumped into the seawater desalination system by an intake pump (not shown) is processed to have certain water qualities by a pretreatment system for removing suspended matter or the like, and then the pretreated seawater is supplied via a feed pump 2 into a high-pressure pump 3 to which a motor M is directly connected. The seawater which has been pressurized by the high-pressure pump 3 is supplied to a reverse-osmosis membrane-separation apparatus 4 having a reverse-osmosis membrane (RO membrane). The reverse-osmosis membrane-separation apparatus 4 separates the seawater concentrated seawater with a high salt content and fresh water with a low salt content, thus obtaining the fresh water from the seawater. At this time, the remaining high-pressure concentrated seawater from which the fresh water has been separated is discharged from the reverse-osmosis membrane-separation apparatus 4, and is then supplied into a pressure convention chamber 6 from a concentrated seawater port 7 via a switching valve 5.

On the other hand, the seawater which is delivered from the feed pump 2 to the high-pressure pump 3 is partly branched and taken out, and the seawater which has been taken out is supplied into the pressure exchange chamber 6 from a seawater port 9 through a directional control valve 8. The directional control valve 8 comprises a check valve unit which has a check valve 10 for allowing the seawater pressurized in the chamber to discharge only to the outside, and a check valve 11 for allowing the seawater to flow only in the direction for supplying the seawater to the chamber.

The pressure exchange chamber 6 has a piston 12 therein, and the piston 12 is arranged to be movable in the pressure exchange chamber 6 while separating an interior of the pressure exchange chamber into two volume chambers. The switching valve 5, the directional control valve 8 and the pressure exchange chamber 6 constitute an energy recovery device 1. The energy recovery device 1 is shown by a flame enclosed by dashed-dotted lines.

When the concentrated seawater in the pressure exchange chamber 6 is discharged to the outside of the chamber by the switching valve 5 and is depressurized down to atmospheric pressure, the seawater supplied into the chamber from the seawater port 9 pushes the piston 12. When the piston moves from the seawater port side to the concentrated seawater port side, the seawater is charged in an amount corresponding to the movement of the piston into the pressure exchange chamber. Then, when the switching valve 5 and the directional control valve 8 are switched to supply the high-pressure concentrated seawater into the pressure exchange chamber 6, the pressure of the high-pressure concentrated seawater supplied to the pressure exchange chamber 6 pushes the piston 12, thus pressurizing the seawater. The piston moves from the concentrated seawater port side to the seawater port side, and the seawater is discharged in an amount corresponding to the movement of the piston from the pressure exchange chamber 6.

The seawater discharged from the pressure exchange chamber 6 is supplied to the booster pump 13 through the directional control valve 8. The seawater is further pressurized by the booster pump 13 so that the seawater has the same pressure level as the discharge line of the high-pressure pump 3, and the pressurized seawater merges via a valve 19 into the discharge line of the high-pressure pump 3 and is then supplied to the reverse-osmosis membrane-separation apparatus 4. The valve 19 in the discharge line of the booster pump 13 comprises a check valve for allowing the seawater to flow only in the direction from the booster pump 13 to the reverse-osmosis membrane-separation apparatus side, and is provided to prevent the seawater from flowing backward to the booster pump 13.

Here, in the energy recovery device 1 which comprises the pressure exchange chamber 6 having the piston 12 as shown in FIG. 19, the piston can be reciprocated in the predetermined movement range. Therefore, by moving the piston in the pressure exchange chamber 6 by the same reciprocating distance, the supply amount of the seawater and the discharge amount of the seawater can be the same and constant at all times.

On the other hand, there is an apparatus comprising a pressure exchange chamber having no piston in which movement of seawater or concentrated seawater in the chamber is repeated to recover energy from the high-pressure concentrated seawater by opening and closing operation of valves provided before and after the chamber while utilizing the difference between the pressure of the seawater and the pressure of the high-pressure concentrated seawater processed by the reverse-osmosis membrane (RO membrane).

FIG. 20 is a schematic view showing a seawater desalination system which incorporates an energy recovery device using such pressure exchange chamber 6 having no piston. A process for pressurizing seawater in the pressure exchange chamber 6 directly by high-pressure concentrated seawater processed by the reverse-osmosis membrane (RO membrane) to deliver the pressurized seawater to the booster pump 13, and a process for purging the high-pressure concentrated seawater filled in the pressure exchange chamber 6 to the outside of atmospheric pressure from one end side of the pressure exchange chamber 6 and supplying the seawater into the pressure exchange chamber 6 from the other end side of the pressure exchange chamber 6 are repeated, thereby recovering the energy of the high-pressure concentrated seawater processed by the reverse-osmosis membrane (RO membrane) by the seawater.

In such energy recovery device 1 having no piston, the control of supply and discharge of the seawater to the pressure exchange chamber 6 is performed by measuring a first flow rate of the seawater discharged by the high-pressure concentrated seawater supplied to the pressure exchange chamber 6 and a second flow rate of the concentrated seawater purged to the outside of the pressure exchange chamber 6 when the seawater is supplied to the pressure exchange chamber 6, and by balancing both the flow rates or both integrated flow rates. Therefore, as shown in FIG. 20, it is necessary to provide two flowmeters comprising a first flowmeter F1 and a second flowmeter F2 for measuring the respective flow rates in the energy recovery device 1. The first flowmeter F1 and the second flowmeter F2 are connected to a sensor controller 17, and the sensor controller 17 is connected to a device controller 18. Other structural elements of the seawater desalination system shown in FIG. 20 are the same as those of the seawater desalination system shown in FIG. 19.

Next, the reason for necessitating the two flowmeters will be described. Specifically, even if the intake amount of the seawater of the pressure exchange chamber 6 becomes small, when the discharge amount of the seawater is still the same amount before the intake amount becomes small, the portion with a high salt content caused by the high-pressure concentrated seawater is discharged from the energy recovery device subsequent to the discharge of the seawater because there is no partition by the piston. Further, conversely, even if the intake amount of the seawater becomes large, when the seawater is discharged still in the same amount as before the intake amount becomes large, extra seawater is drawn into the device, and thus the incremental amount cannot be discharged from the energy recovery device.

When the former state occurs, since the concentrated seawater is supplied to the pressure exchange chamber 6 in an amount larger than the intake amount of the seawater, the salt content of the seawater supplied to the reverse-osmosis membrane becomes high. Therefore, because of the property of the reverse-osmosis membrane, when the seawater with a high salt content is supplied, the production amount of fresh water decreases. When the latter state occurs, the seawater which has been pretreated is consumed wastefully, and thus the cost of pretreatment increases relative to the production amount of fresh water.

Thus, it is important for the energy recovery device having no piston to monitor the flow rate of intake of the seawater and the flow rate of discharge of the seawater and to make both the flow rates the same and constant in maintaining the performance of the device.

Since the fluid discharged from the pressure exchange chamber 6 has a high-pressure which is about 60 atmospheric pressure, the first flowmeter F1 needs to be high-pressure specification. Further, in order to control the supply and discharge of the fluid, it is preferable for the first flowmeter F1 to use a flowmeter having a small measurement error with respect to the second flowmeter F2 separately provided, i.e., a flowmeter having high measurement accuracy.

Although there are various types of flowmeters, presently, the flowmeter having the highest measurement accuracy is an electromagnetic flowmeter, and thus the electromagnetic flowmeter having high-pressure specification is used.

However, the electromagnetic flowmeter is expensive relative to other types of flowmeters. Further, in principle, a detecting portion of the electromagnetic flowmeter is required to be brought into direct contact with the fluid to be measured, and thus it is essential for a liquid-contacting part including the detecting portion of the flowmeter to be made of a material having corrosion resistance against the seawater as a corrosive fluid. Furthermore, the flowmeter is required to have high-pressure specification, and hence needs to have a large thickness for ensuring pressure resistance of the flow passage. In short, the flowmeter is special and expensive, large in size, and heavy in weight.

On the other hand, when the seawater is supplied to the pressure exchange chamber and the concentrated seawater in the pressure exchange chamber is purged to the outside, the pressure of the discharged concentrated seawater is close to atmospheric pressure, and hence low pressure. Accordingly, the second flowmeter F2 generally does not have high-pressure specification. Specifically, since the first flowmeter and the second flowmeter often have different specifications, the first flowmeter and the second flowmeter require calibration and correction in consideration of their characteristics.

Further, since the flowmeter generally requires to make the measurement conditions constant, it is necessary to provide an entrance interval of flow before and after the detecting portion of the flowmeter. When an inner diameter of a pipe before and after the attachment portion of the flowmeter is D, the length of the entrance interval is in the range of 5×D to 10×D. Therefore, it is necessary to provide the straight pipe which is large in length before and after the flowmeter.

In this manner, turbulence of flow generated in the detecting portion of the flowmeter by the effect of expansion, shrinkage or bending of the pipe at the upstream side or the downstream side of the flowmeter can be reduced to reduce the measurement error. However, restriction on piping design arises, and layout in which the straight pipe portion is provided needs to be designed. Since the long straight pipe portion is usually provided outside the energy recovery device, installation design of the flowmeter, wiring design, signal communication, and calibration are required to be performed according to the plant in which the energy recovery device is provided. In particular, a normal seawater desalination system having a plurality of pressure exchange chambers is greatly affected as follows:

In the case of using the pressure exchange chamber, as the amount of produced fresh water increases, the amount to be processed in the pressure exchange chamber increases. However, even if the volume of a single pressure exchange chamber is enlarged or the processing cycle is shortened, such countermeasures have their own limits. Therefore, in many cases, a method in which the pressure exchange chambers are arranged in parallel in a multistage manner is selected.

FIG. 21 is a schematic view showing an arrangement configuration of flowmeters in the case where a plurality of pressure exchange chambers having no piston are provided in parallel. As shown in FIG. 21, n pressure exchange chambers 6 are provided in parallel, seawater discharged from the n pressure exchange chambers 6 and concentrated seawater discharged from the n pressure exchange chambers 6 are collected respectively in respective collecting pipes, and then the flow rate of the seawater and the flow rate of the concentrated seawater are measured respectively by the first flowmeter F1 and the second flowmeter F2. In this case, the first flowmeter F1 and the second flowmeter F2 are provided singly. However, if the number of chambers are large and the processing flow rate is large, the diameter of the collecting pipe to which the flowmeter is attached becomes large, and thus it is necessary to enlarge the size of the flowmeter. Further, the pipe serving as the entrance interval before and after the flowmeter becomes large in length. Further, in particular, the first flowmeter F1 for measuring the flow rate of the seawater at the high-pressure side becomes large in size and heavy in weight from the necessity of pressure resistance. Therefore, the first flowmeter F1 becomes special and expensive. Further, the replacement of the flowmeter at the time of failure needs extensive work, and thus the suspension of the entire system for a long period of time may be caused. In order to deal with this situation, as shown in FIG. 21, a backup line F1' of the first flowmeter and a backup line F2' of the second flowmeter should be prepared. However, such measures have difficulty in securing space or the like.

CITATION LIST

Patent Literature

Patent document 1: Japanese patent No. 4870648
Patent document 2: Japanese laid-open patent publication No. 2013-139012
Patent document 3: Japanese laid-open patent publication No. 2010-284642

SUMMARY OF INVENTION

Technical Problem

In view of the above background art, in the control of supply and discharge of the seawater and the concentrated seawater as a key element for maintaining performance of the energy recovery device having no piston, the flowmeters for measuring the flow rates of supply and discharge of the seawater and the concentrated seawater have the following technical problems:

1) The risk of corrosion caused by the seawater and the concentrated seawater as a corrosive fluid can be reduced or eliminated.

2) An increase of the capacity of the flowmeters for measuring flow rates of supply and discharge of the seawater and the concentrated seawater, caused by an increase of the processing flow rate of the energy recovery device, and hence an increase of cost becomes small or can be avoided.

3) The plan and design to the plant facility side outside the energy recovery device is unaffected.

It is therefore an object of the present invention to provide an energy recovery device having a flowmeter or flowmeters which can meet all or any one of the above 1) to 3) technical problems.

Solution to Problem

In order to achieve the above object, according to one aspect of the present invention, there is provided a pressure exchange chamber for pressurizing seawater by a pressure of concentrated seawater discharged from a reverse-osmosis membrane-separation apparatus in a seawater desalination system for producing fresh water from the seawater by separating the seawater into fresh water and concentrated seawater by the reverse-osmosis membrane-separation apparatus, the pressure exchange chamber comprising: a first supply and discharge port provided at one end of the chamber and configured to perform supply and discharge of liquid, the first supply and discharge port being connected to a switching valve which is provided outside the chamber and is configured to supply a high-pressure or low-pressure liquid; a second supply and discharge port provided at the other end of the chamber and configured to perform supply and discharge of liquid, the second supply and discharge port being connected to a directional control valve which is provided outside the chamber and is configured to supply a high-pressure or low-pressure liquid; a flow resistor provided at the first supply and discharge port side in the chamber and configured to regulate the flow, and a flow resistor provided at the second supply and discharge port side in the chamber and configured to regulate the flow; and a flowmeter provided between the two flow resistors and configured to measure a flow rate of the liquid in the chamber.

With the above arrangement, a pressure exchange chamber which is preferably used in a seawater desalination system having a pressure exchange chamber with no piston can be provided.

Specifically, if the above pressure exchange chamber is used, both of the flow of supply of liquid and the flow of discharge of liquid can be measured by the single flowmeter, i.e., the flow rate, the flow velocity, or the integrated flow rate of supply and discharge of liquid to the pressure exchange chamber can be measured by the single flowmeter. Therefore, calibration and correction of the two flowmeters become unnecessary. Further, since the flow of fluid flowing into the chamber from each port is regulated by the flow resistor provided in the interior of the chamber, a straight pipe portion as an entrance interval for regulating the flow which is generally required before and after the flowmeter becomes unnecessary, and the structure around the apparatus becomes compact and measurement can be performed with high accuracy.

Therefore, an increase of the capacity of the flowmeter for measuring the flow rates of supply and discharge of the seawater and the concentrated seawater, caused by an increase of the processing flow rate of the energy recovery device can be suppressed, and hence the pressure exchange chamber which can make an increase of cost smaller can be provided.

Further, in order to achieve the above object, according to one aspect of the present invention, there is provided an energy recovery device for pressurizing seawater by a pressure of concentrated seawater discharged from a reverse-osmosis membrane-separation apparatus in a seawater desalination system for producing fresh water from the seawater by separating the seawater into fresh water and concentrated seawater by the reverse-osmosis membrane-separation apparatus, the energy recovery device comprising: a plurality of pressure exchange chambers configured to convert a pressure of the concentrated seawater to a pressure of the seawater; a concentrated seawater port provided at one end of the pressure exchange chamber and configured to perform supply and discharge of the concentrated seawater, and a seawater port provided at the other end of the pressure exchange chamber and configured to perform supply and discharge of the seawater; a switching valve connected to the concentrated seawater port and configured to perform supply and discharge of high-pressure or low-pressure concentrated seawater, and a directional control valve connected to the seawater port and configured to perform supply and discharge of high-pressure or low-pressure seawater; and a flowmeter provided in at least one of the pressure exchange chambers and configured to measure a flow rate or an integrated flow rate of the seawater or the concentrated seawater in the chamber.

Conventionally, in the energy recovery device which has a pressure exchange chamber having no piston, the two flowmeters are provided at the low-pressure side and the high-pressure side of the pressure exchange chamber. However, according to the present invention, both of the flow of supply of liquid and the flow of discharge of liquid can be measured by the single flowmeter, i.e., the flow rates of supply and discharge, the flow velocity or the integrated flow rate of the seawater to the pressure exchange chamber can be measured by the single flowmeter. Specifically, by the switching valve, the concentrated seawater and the seawater are supplied into the chamber and discharged from the chamber alternately from the both ends of the pressure exchange chamber. Thus, while the direction of flow of the fluid in the chamber is switched alternately, the fluid flows uniformly. As a result, the flow rate or the integrated flow rate of the seawater or the concentrate seawater can be measured.

Further, calibration and correction of the two flowmeters which have been necessary in the case of using the two different flowmeters become unnecessary.

Furthermore, in the case of the seawater desalination system comprising a plurality of pressure exchange chambers, it is sufficient to provide a flowmeter in at least one pressure exchange chamber to deal with the control of the system. Therefore, a large diameter flowmeter suitable for a collecting pipe having a large diameter and a long entrance interval become unnecessary, and hence cost can be greatly reduced.

Therefore, an increase of the capacity of the flowmeter for measuring the flow rates of supply and discharge of the seawater and the concentrated seawater, caused by an increase of the processing flow rate of the energy recovery device can be suppressed, and hence an increase of cost can be smaller.

According to a preferred aspect of the present invention, a flow resistor configured to regulate the flow is provided at the concentrated seawater port side and a flow resistor configured to regulate the flow is provided at the seawater port side, and the flowmeter is provided between the two flow resistors.

With this arrangement, since the flow resistor disposed at the concentrated seawater port side and the flow resistor disposed at the seawater port side are provided in the chamber, the flow of fluid flowing into the chamber from the respective ports can be regulated by the flow resistors. Therefore, a straight pipe portion as an entrance interval for regulating the flow which is generally required before and after the flowmeter is not required to be provided outside the chamber, and the structure around the apparatus becomes compact and measurement can be performed with high accuracy.

Therefore, an increase of the capacity of the flowmeter for measuring the flow rates of supply and discharge of the seawater and the concentrated seawater, caused by an increase of the processing flow rate of the energy recovery device can be suppressed, and hence an increase of cost can be smaller.

According to another aspect of the present invention, there is provided an energy recovery device for pressurizing seawater by a pressure of concentrated seawater discharged from a reverse-osmosis membrane-separation apparatus in a seawater desalination system for producing fresh water from the seawater by separating the seawater into fresh water and concentrated seawater by the reverse-osmosis membrane-separation apparatus, the energy recovery device comprising: a plurality of pressure exchange chambers configured to convert a pressure of the concentrated seawater to a pressure of the seawater; a concentrated seawater port provided at one end of the pressure exchange chamber and configured to perform supply and discharge of the concentrated seawater, and a seawater port provided at the other end of the pressure exchange chamber and configured to perform supply and discharge of the seawater; a flow resistor provided at the concentrated seawater port side in the chamber and configured to regulate the flow and a flow resistor provided at the seawater port side in the chamber and configured to regulate the flow; and a flowmeter provided in at least one of the pressure exchange chambers and between the two flow resistors and configured to measure a flow rate or an integrated flow rate of the seawater or the concentrated seawater in the chamber.

With the above arrangement, the energy recovery device which has a pressure exchange chamber having no piston can be properly operated and controlled.

Conventionally, in the energy recovery device which has a pressure exchange chamber having no piston, the two flowmeters are provided at the low-pressure side and the high-pressure side of the pressure exchange chamber. However, according to the present invention, both of the flow of supply of liquid and the flow of discharge of liquid can be measured by the single flowmeter, i.e., the flow rates of supply and discharge, the flow velocity or the integrated flow rate of the seawater to the pressure exchange chamber can be measured by the single flowmeter.

Further, since the flow of fluid flowing into the chamber from the respective ports can be regulated by the flow resistors provided in the interior of the chamber, a straight pipe portion as an entrance interval for regulating the flow which is generally required before and after the flowmeter is not required to be provided, and the structure around the apparatus becomes compact and measurement can be performed with high accuracy.

Furthermore, in the case of the seawater desalination system comprising a plurality of pressure exchange chambers, it is sufficient to provide a flowmeter in at least one pressure exchange chamber to deal with the control of the system. Therefore, a large diameter flowmeter suitable for a collecting pipe having a large diameter and a long entrance interval become unnecessary, and hence cost can be greatly reduced.

Therefore, an increase of the capacity of the flowmeter for measuring the flow rates of supply and discharge of the seawater and the concentrated seawater, caused by an increase of the processing flow rate of the energy recovery device can be suppressed, and hence the pressure exchange chamber which can make an increase of cost smaller can be provided.

According to a preferred another aspect of the present invention, the flowmeter comprises an ultrasonic flowmeter which has a set of ultrasonic transmitter and receiver configured to measure a flow velocity or a flow rate in the chamber from a cylindrical outer surface of the chamber, and a sensor controller.

With the above arrangement, the ultrasonic flowmeter has no better performance than the electromagnetic flowmeter, but the ultrasonic flowmeter for measuring the flow velocity or the flow rate in the chamber from the cylindrical outer circumferential surface of the chamber is provided. Accordingly, the following effects can be achieved.

1) The flowmeter has no portion which is brought into contact with the seawater or the concentrated seawater, and thus the flowmeter is not corroded and does not need to be corrosion-resistant specification, unlike the conventional measuring instrument such as an electromagnetic flowmeter which allows the high-pressure seawater or concentrated seawater to pass through the interior of the flowmeter for measurement.

2) Conventionally, since the pressure of the line for supplying the seawater pressurized in the pressure exchange chamber to the booster pump is high, and thus the flowmeter attached to such line is required to be high-pressure specification. However, in the case where the transmitter and receiver of the ultrasonic flowmeter is attached to the chamber from the outside of the chamber, the chamber itself is a pressure-resistant container, and thus the flowmeter does not need to be high-pressure specification. Therefore, the flowmeter can be more compact.

Further, when a plurality of pressure exchange chambers are used in the seawater desalination system, in the collecting pipe system in which the seawater or the concentrated seawater from the respective chambers merges, the flowmeter is provided in the collecting pipe. Therefore, the flowmeter becomes large in diameter and high-pressure specification, and the entrance interval corresponding to the large diameter is require before and after the flowmeter, thus becoming expensive and requiring a large installation space. However, according to the present invention, the flowmeter is not required to be attached to the collecting pipe, thus solving such problems.

3) Further, because the flowmeter is an external unit which can be attached from outside, the replacement of the flowmeter at the time of failure or the like can be simply performed without removing connection of the pipe, i.e., without causing the internal liquid to open up and suspending the energy recovery device.

According to a preferred aspect of the present invention, the flowmeter comprises an electromagnetic flowmeter.

By using the conventional electromagnetic flowmeter in the present invention, superior performance of the conventional electromagnetic flowmeter can be maintained as it is, the single electromagnetic flowmeter can deal with the requirement of the device side. The detecting portion of the electromagnetic flowmeter is brought into contact with the seawater or the concentrated seawater, but the number of the electromagnetic flowmeters can be reduced from two to one, and thus the probability of failure such as detection failure caused by corrosion can be lowered.

According to a preferred another aspect of the present invention, the flow resistor comprises a circular plate member in which at least one hole is formed, and one or more flow resistors are provided respectively at the seawater port side and the concentrated seawater port side, and each flow resistor is disposed such that a plate surface of the flow resistor is parallel to a plane perpendicular to a cylindrical axis of the chamber.

With this arrangement, since the flow of fluid is regulated at the measuring location for measuring the flow rate or the flow velocity by the ultrasonic flowmeter in the pressure exchange chamber, the measurement can be performed stably in a good reproducible manner. Accordingly, the flow rate control can be performed with high accuracy.

Next, in order to achieve the above object, according to one aspect of the present invention, there is provided a seawater desalination system comprising: a feed pump configured to pressurize seawater; a high-pressure pump configured to pressurize the seawater discharged from the feed pump; a reverse-osmosis membrane-separation apparatus configured to separate the seawater pressurized by the high-pressure pump into fresh water and concentrated seawater; an energy recovery device having a plurality of pressure exchange chambers which are supplied with the seawater discharged from the feed pump, and pressurize and discharge the seawater by a pressure of the concentrated seawater; a booster pump configured to pressurize the seawater discharged from the energy recovery device; and a switching valve configured to switch supply of the concentrated seawater to the pressure exchange chamber and discharge of the concentrated seawater from the pressure exchange chamber; wherein the energy recovery device comprises at least one pressure exchange chamber which has a cylindrical shape having a space for containing the concentrated seawater and the seawater and having a cylindrical axis disposed vertically, a flowmeter provided in the at least one pressure exchange chamber and configured to measure a flow rate of the seawater and a flow rate of the concentrated seawater in the chamber, and a device controller configured to output an operational signal to the switching valve on the basis of measuring information of the flowmeter; and a system controller which is a controller connected to the device controller and controls the feed pump, the high-pressure pump and the booster pump.

With the above arrangement, since the intake seawater from the sea is processed to have water qualities suitable for the reverse-osmosis membrane-separation apparatus by the pretreatment system, deterioration, clogging or the like of the membrane can be prevented, and thus the seawater desalination system can be operated normally for a long period time.

Further, since the supply amount and the discharge amount of the seawater and the concentrated seawater in the energy recovery device are controlled by utilizing the measured values measured by the ultrasonic flowmeter provided at the outside of the pressure exchange chamber, the reliable system which can reduce consideration for seawater corrosion and pressure resistance can be constructed.

Further, both of the supply amount and the discharge amount of the seawater can be measured by the ultrasonic flowmeter provided in the pressure exchange chamber, thus requiring only one flowmeter.

Further, since the flowmeter and the device controller are provided in the device without providing the flowmeter outside the energy recovery device, unlike the conventional energy recovery device, the control of the supply amount and the discharge amount can be completed in the energy recovery device. Therefore, pipes to the plant side or arrangement of control specification can be reduced.

Further, since the system controller for controlling the feed pump, the high-pressure pump, the booster pump, the automatic valves and the like of the plant, and the device controller are connected to each other, the control of the energy recovery device can be performed according to instructions or information from the system controller.

Further, since the cylindrical axis of the pressure exchange chamber is disposed vertically, the uniformity of flow in the chamber can be maintained with respect to the measurement direction of the ultrasonic flowmeter by the specific gravity of the concentrated seawater and the seawater, and the measurement of the flow rate or the flow velocity by the ultrasonic flowmeter can be performed stably in a good reproducible manner, thus achieving the flow rate control with high accuracy.

Further, in order to achieve the above object, according to one aspect of the present invention, there is provided a method for controlling a seawater desalination system configured to produce fresh water from seawater by separating the seawater into fresh water and concentrated seawater with a reverse-osmosis membrane-separation apparatus, the method comprising: a first step for supplying the high-pressure concentrated seawater from one end side of a pressure exchange chamber of an energy recovery device, and moving the seawater toward an end surface of the opposite side of the chamber while pressurizing the seawater contained in the chamber; a second step for supplying the seawater from the end surface of the opposite side of the chamber, and moving the concentrated seawater contained in the chamber toward the one end side of the chamber; wherein in the first and second steps, the seawater and the concentrated seawater moving in the chamber pass through respective flow resistors provided in the chamber to regulate the flow of the seawater and the flow of the concentrated seawater, and then the seawater and the concentrated seawater pass respectively through a flowmeter provided in the chamber to measure a flow velocity or a flow rate or an integrated flow rate; and the flow rates of supply and discharge of the seawater and the concentrated seawater to the pressure exchange chamber are controlled on the basis of the measured values obtained by the measurement.

According to a preferred aspect of the present invention, a plurality of the pressure exchange chambers whose internal shapes are the same shape are provided, the flowmeter is provided in at least one of the pressure exchange chambers, and supply and discharge of the concentrated seawater and the seawater to another chamber or other chambers is controlled on the basis of the measured value of the flowmeter.

With this arrangement, one pressure exchange chamber is determined to be standard, and the other pressure exchange chambers are controlled on the basis of the determined standard, and thus the pressure exchange chambers can be controlled with ease and high accuracy. Further, the number of ultrasonic flowmeters to be installed can be reduced, and thus the system can be constructed inexpensively.

According to a preferred aspect of the present invention, the supply amount of the seawater to the pressure exchange chamber and the discharge amount of the seawater pressurized and pushed out by the concentrated seawater are calculated; and on the basis of the calculation result, operational signals for determining supply and discharge time by the switching valve and opening of the switching valve for adjusting the supply amount and the discharge amount are generated to control the supply amount and the discharge amount.

With this arrangement, the supply amount of the seawater to the pressure exchange chamber and the discharge amount of the seawater from the chamber can be equalized, and thus one of the supply amount and the discharge amount does not become excessively large. By this operation, there is no possibility that the seawater is supplied into the chamber in an amount larger than the volume of the chamber, or the seawater is discharged from the chamber in an amount larger than the volume of the chamber. When the seawater is supplied into the chamber in amount larger than the volume of the chamber, the seawater is discharged from the drainage side of the concentrated seawater, and thus the seawater which has been adjusted in water qualities by the pretreatment apparatus is discharged wastefully. However, according to the present invention, a waste of the pretreated seawater can be eliminated, and hence inexpensive fresh water can be provided.

Further, when the seawater is discharged from the chamber in an amount larger than the volume of the chamber, the concentrated seawater with a high salt content is discharged from the energy recovery device, and thus the seawater with a high salt content is not supplied to the reverse-osmosis membrane-separation apparatus. Therefore, the production amount of the fresh water can be prevented from being lowered, and it is not necessary to raise the supply pressure of the seawater to the reverse-osmosis membrane-separation apparatus, and hence inexpensive fresh water can be provided.

Advantageous Effects of Invention

According to the present invention, with respect to the energy recovery device having no piston, the following effects can be achieved.

1) Since one flowmeter is attached to the pressure exchange chamber, the arrangement of the flowmeter as an attachment of a single body of the pressure exchange chamber and the arrangement of the flowmeter for the system comprising a plurality of pressure exchange chambers can be compact. Particularly, if the ultrasonic flowmeter having no liquid-contact portion is attached to the pressure exchange chamber as an external unit which can be attached from outside, the flowmeter is not required to be high-pressure specification and corrosion-resistant specification, thus being inexpensive.

The measurement of the flow rate of the seawater and the measurement of the flow rate of the concentrated seawater can be shared by the single flowmeter attached to the pressure exchange chamber, and thus calibration and correction of the two flowmeters become unnecessary. Further, since it is not necessary to provide the entrance interval before and after the flowmeter, the piping space around the pressure exchange chamber becomes compact.

In the case of the system comprising a plurality of chambers, since it is sufficient to attach the flowmeter only to one pressure exchange chamber, it is not necessary to prepare a flowmeter having a large diameter in the collecting pipe.

2) The flowmeter connected to the collecting pipe and the pipe for the entrance interval around the pressure exchange chamber become unnecessary, and the flowmeter is attached to the pressure exchange chamber, and thus the installation of the facility, the replacement work at the time of failure of the flowmeter, and the like become simple.

Further, if the ultrasonic flowmeter is attached to the pressure exchange chamber as an external unit which can be attached from outside and is used, the replacement of the flowmeter can be performed without causing the interior of the chamber container to open up to the atmosphere, and thus the device is not required to be suspended. The arrangement of the flowmeter or flowmeters as a system comprising a plurality of pressure exchange chambers becomes simple, maintenance of the system becomes simple, and the control of the switching valves of the plural pressure exchange chambers by the controller according to the detection information of the flowmeter becomes simple.

DESCRIPTION OF EMBODIMENTS

Figure 1:
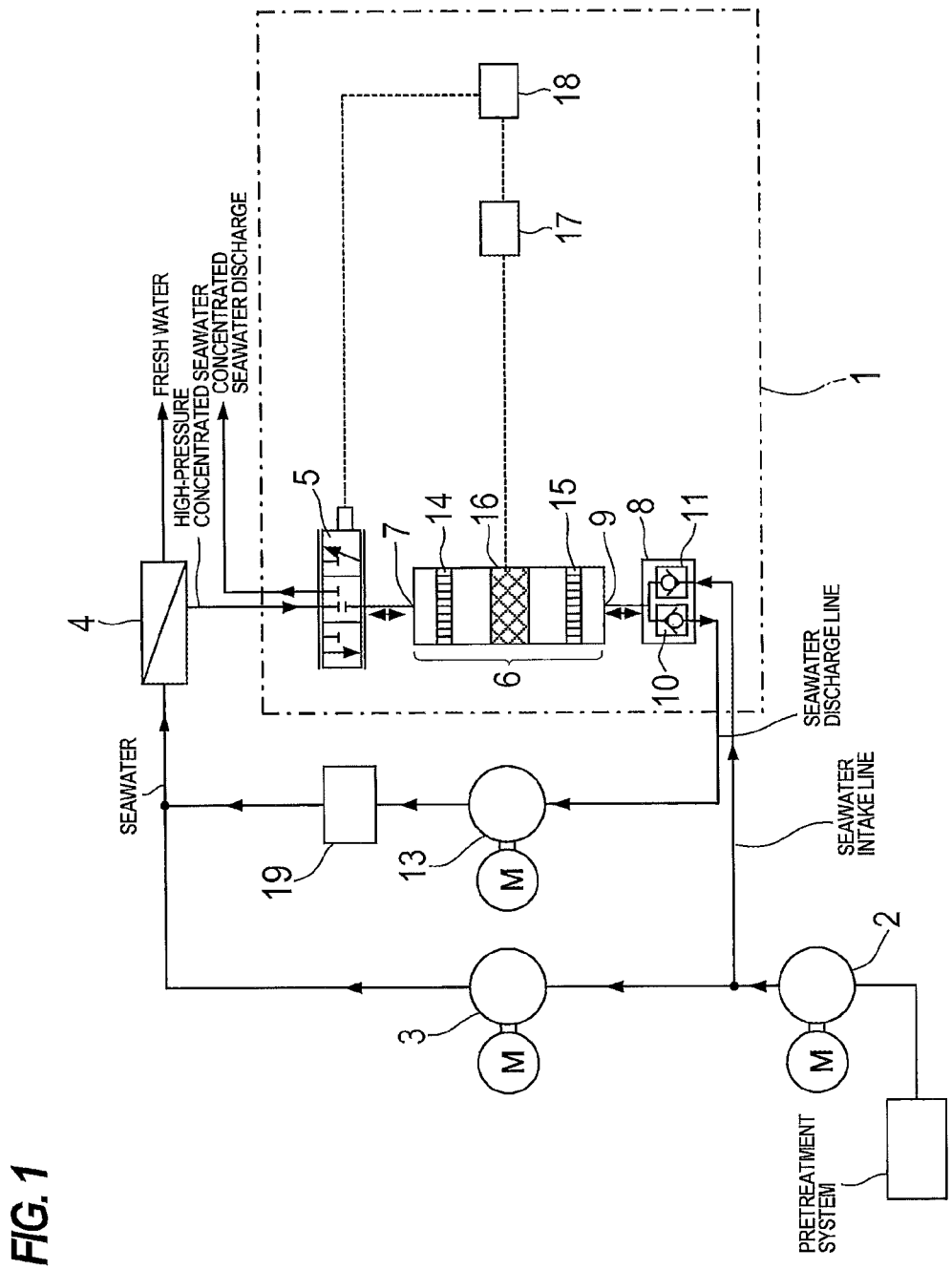
FIG. 1 is a schematic view showing a configuration example of a seawater desalination system using a pressure exchange chamber according to the present invention.

A seawater desalination system and an energy recovery device according to preferred embodiments of the present invention will be described in detail below with reference to FIGS. 1 through 18. Like or corresponding parts are denoted by like or corresponding reference numerals in FIGS. 1 through 18 and will not be described below repetitively.

Figure 20:
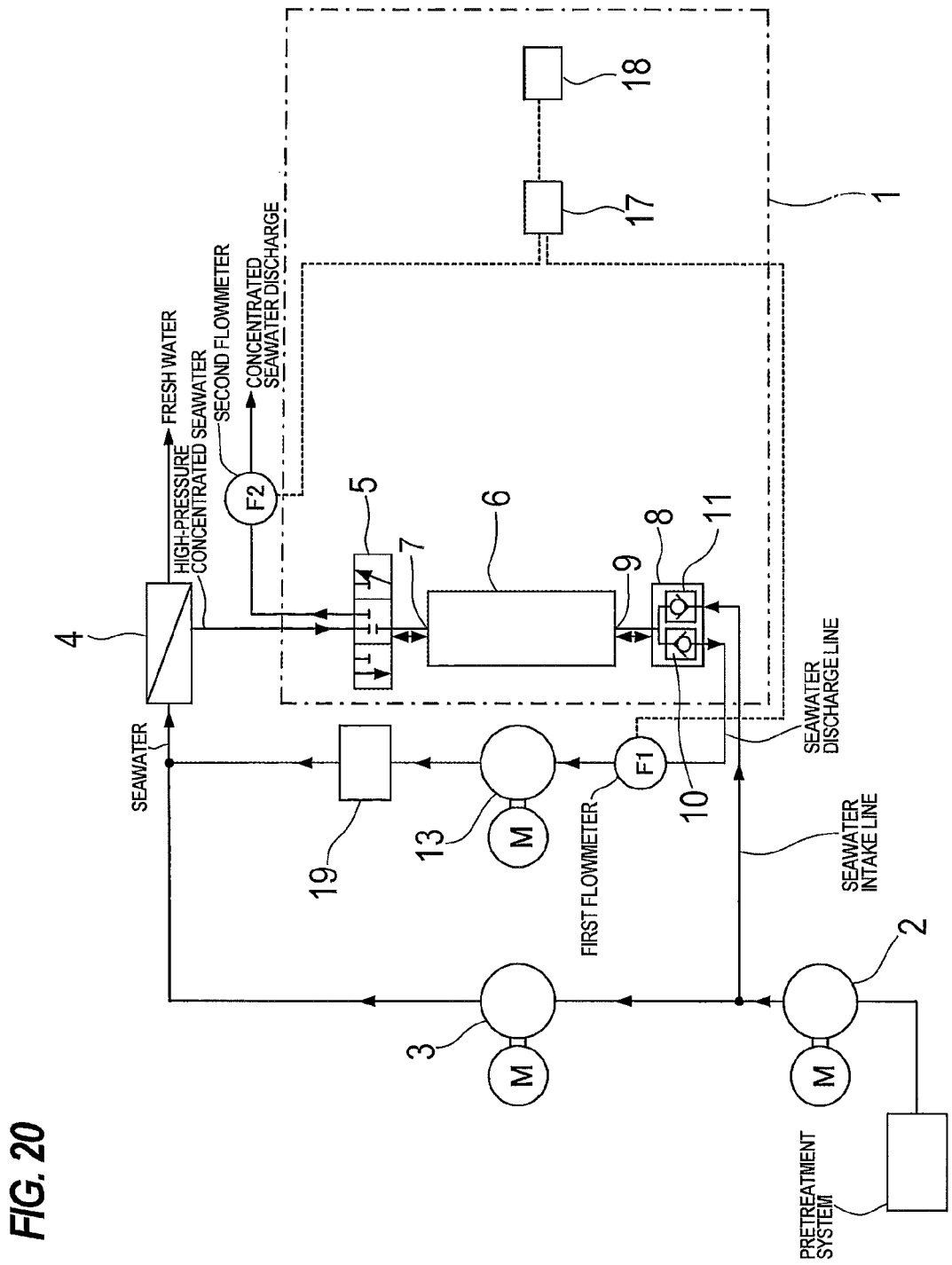
FIG. 20 is a schematic view showing a seawater desalination system which incorporates an energy recovery device using the pressure exchange chamber having no piston.
Figure 21:
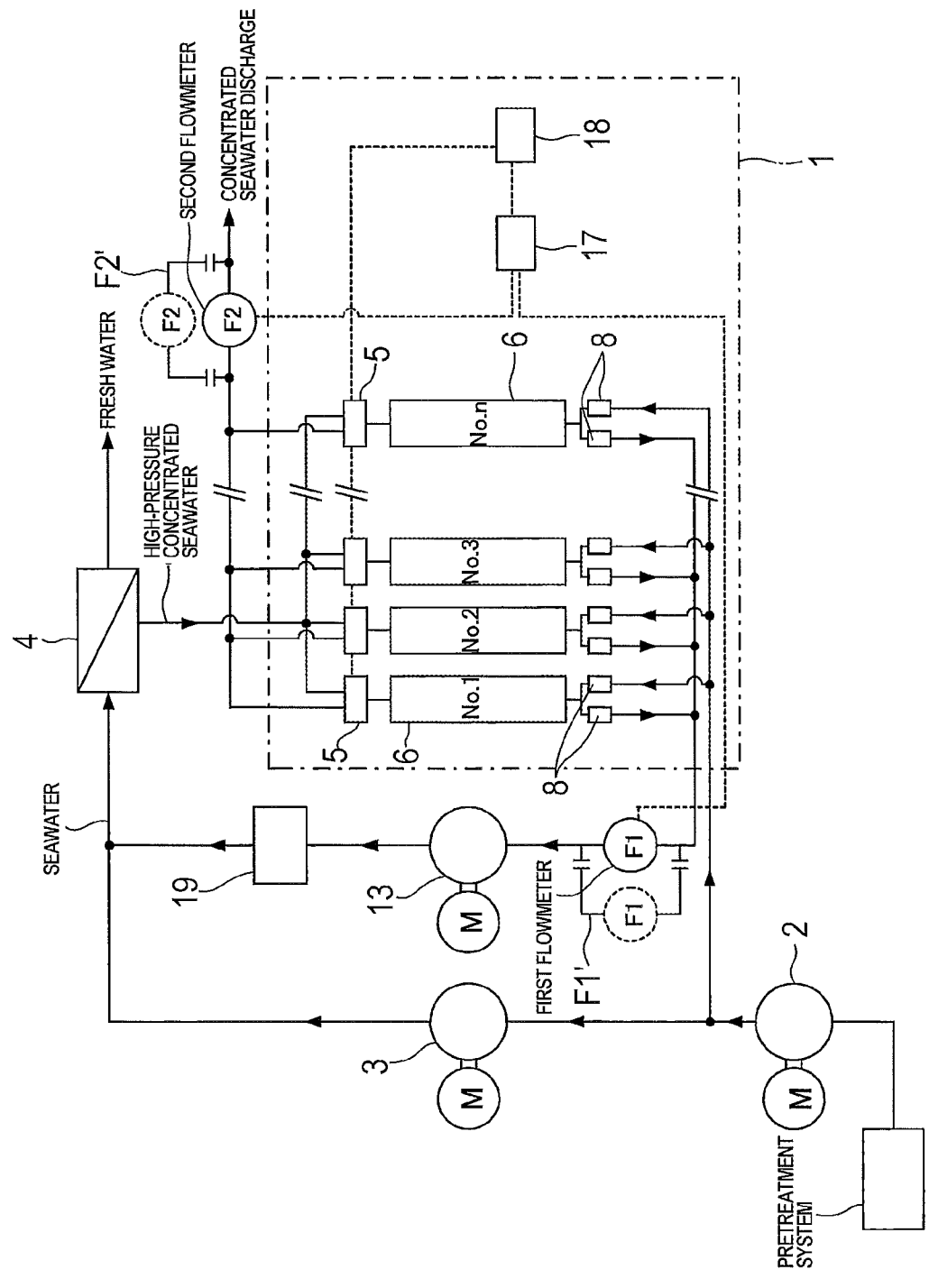
FIG. 21 is a schematic view showing an arrangement configuration of flowmeters in the case where a plurality of pressure exchange chambers having no piston are provided in parallel.

FIG. 1 is a schematic view showing a configuration example of a seawater desalination system using a pressure exchange chamber according to the present invention. Here, the seawater desalination system and the energy recovery device 1 are substantially identical to the conventional configuration and operation described in FIG. 20. However, the seawater desalination system and the energy recovery device are different from the conventional configuration in that the flowmeters for supply and discharge of the seawater and the concentrated seawater for the chamber are not provided in the seawater intake line and the seawater discharge line of the system, but the flowmeter is provided in the pressure exchange chamber instead.

Specifically, as shown in FIG. 1, seawater pumped into the seawater desalination system by an intake pump is processed to have certain water qualities by a pretreatment system for removing suspended matter or the like, and then the pretreated seawater is supplied via a feed pump 2 into a high-pressure pump 3 to which a motor M is directly connected. The seawater which has been pressurized by the high-pressure pump 3 is supplied to a reverse-osmosis membrane-separation apparatus 4 having a reverse-osmosis membrane (RO membrane). The reverse-osmosis membrane-separation apparatus 4 separates the seawater into concentrated seawater with a high salt content and fresh water with a low salt content, thus obtaining the fresh water from the seawater. At this time, the remaining high-pressure concentrated seawater from which the fresh water has been separated is discharged from the reverse-osmosis membrane-separation apparatus 4, and is then supplied into a pressure convention chamber 6 from a concentrated seawater port 7 via a switching valve 5.

On the other hand, the seawater which is delivered from the feed pump 2 to the high-pressure pump 3 is partly branched and taken out, and the seawater which has been taken out is supplied into the pressure exchange chamber 6 from a seawater port 9 through a directional control valve 8. The directional control valve 8 comprises a check valve unit which has a check valve 10 for allowing the seawater pressurized in the chamber to discharge only to the outside, and a check valve 11 for allowing the seawater to flow only in the direction for supplying the seawater to the chamber.

The pressure exchange chamber 6 of the present invention has no piston therein. The pressure exchange chamber 6 has a first supply and discharge port at one end of the chamber for performing supply and discharge of liquid, the first supply and discharge port being connected to a switching valve 5 provided outside the chamber and configured to supply high-pressure or low-pressure liquid. The pressure exchange chamber 6 has a second supply and discharge port at the other end of the chamber for performing supply and discharge of liquid, the second supply and discharge port being connected to a switching valve provided outside the chamber and configured to supply high-pressure or low-pressure liquid. The first supply and discharge port is connected to the switching valve 5 for supply and discharge of the concentrated seawater, thereby forming a concentrated seawater port 7. The second supply and discharge port is connected to the switching valve 8 for supply and discharge of the seawater, thereby forming a seawater port 9.

Further, in the interior of the pressure exchange chamber 6, there are provided a flow resistor 14 located at the first supply and discharge port side and configured to regulate the flow of the supplied concentrated seawater and a flow resistor 15 located at the second supply and discharge port side and configured to regulate the flow of the supplied seawater. Further, in the interior of the pressure exchange chamber 6, a flowmeter 16 for measuring a flow rate of fluid in the pressure exchange chamber is provided between these two flow resistors. The flowmeter 16 may comprise a conventional electromagnetic flowmeter which is reliable in accuracy and responsiveness, but may preferably comprise an ultrasonic flowmeter (described later). Because the flow of fluid is regulated by the flow resistors 14 and 15, the shape of the chamber between the two flow resistors is preferably a hollow cylindrical shape in the case where both of the electromagnetic flowmeter and the ultrasonic flowmeter are applied.

When the concentrated seawater in the pressure exchange chamber is discharged to the outside of the chamber by the switching valve 5 and is depressurized down to atmospheric pressure, the seawater is supplied to the chamber from the seawater port 9 via the directional control valve 8. The seawater supplied from the seawater port 9 is regulated by the flow resistor 15 and becomes uniform flow, and moves and passes through the flowmeter 16 while pushing out the concentrated seawater. The measurement information of the flowmeter 16 is transmitted via the flowmeter 16 or a sensor controller 17 to a device controller 18. Then, when a predetermined flow rate or integrated flow rate is counted, the switching valve, for example, the switching valve 5 which has been discharging the concentrated seawater is controlled by the device controller 18, thus stopping discharge of the concentrated seawater.

Then, the switching valve 5 is switched so that the high-pressure concentrated seawater supplied from the reverse-osmosis membrane-separation apparatus 4 is supplied to the pressure exchange chamber 6. The high-concentrated seawater supplied to the pressure exchange chamber 6 are regulated by the flow resistor 14 and becomes uniform flow, and moves and passes through the flowmeter 16 while pressurizing the seawater and pushing out the seawater. The measurement information of the flowmeter 16 is transmitted to the device controller 18 via the flowmeter 16 or the sensor controller 17. Then, when a predetermined flow rate or integrated flow rate is counted, the switching valve, for example, the switching valve 5 which has been supplying the concentrated seawater is controlled by the device controller 18, thus stopping supply of the concentrated seawater. In this manner, the switching valve 5 repeats operations so that the concentrated seawater is supplied to the pressure exchange chamber and the concentrated seawater is discharged from the pressure exchange chamber.

The switching valve 5 for supply and discharge of the concentrated seawater and the directional control valve 8 for supply and discharge of the seawater may be configured such that both of the switching valve 5 and the directional control valve 8 are operated by control signals or the like by the device controller 18. Further, the pressure exchange chamber 6 preferably has a cylindrical shape as an internal shape of the chamber, and hence a concentrated seawater port and a seawater port at respective end portions of the longitudinal direction. In addition to this, in the case where a plurality of pressure exchange chambers are provided, it is desirable that the internal shapes of all the chambers are the same. Then, the pressure exchange chamber is preferably disposed such that the longitudinal direction of the chamber lies in a vertical direction. The concentrated seawater having larger specific gravity is supplied to and discharged from the chamber at a lower part of the pressure exchange chamber, and the seawater having smaller specific gravity is supplied to and discharged from the chamber at an upper part of the pressure exchange chamber. Thus, stirring and mixing of the concentrated seawater and the seawater is reduced to balance the supply and discharge amount of the seawater and the supply and discharge amount of the concentrated seawater, thus suppressing an increase in salt concentration of the seawater discharged from the energy recovery device, i.e., suppressing the so-called mixing.

The seawater pressurized by the concentrated seawater moves to the seawater port side, and the seawater is discharged from the pressure exchange chamber 6 in an amount corresponding to movement of the seawater. The seawater discharged from the pressure exchange chamber 6 is supplied to the booster pump 13 via the directional control valve 8. The seawater is further pressurized by the booster pump 13 so that the pressure of the seawater becomes the same level as that in the discharge line of the high-pressure pump 3, and the pressurized seawater merges into the discharge line of the high-pressure pump 3 through the valve 19 and is then supplied to the reverse-osmosis separation apparatus 4.

As described above, conventionally, the two flowmeters are provided at the low-pressure side and the high-pressure side as an external unit of the energy recovery device. According to the present invention, by providing the flowmeter 16 in the pressure exchange chamber 6, both flows of supply of fluid and discharge of fluid can be measured by a single flowmeter. Specifically, the flow rate of supply of the seawater to the pressure exchange chamber, the flow rate of discharge of the seawater from the pressure exchange chamber, and the flow velocity or the integrated flow rate can be measured by the single flowmeter. Further, calibration and correction of the two flowmeters which have been necessary in the case of using the two different flowmeters become unnecessary.

This is because the accuracy of absolute flow rate values of supply of the seawater to the energy recovery device and discharge of the seawater from the energy recovery chamber does not have a large effect on the control of the supply amount and the discharge amount. For example, when the supply of 100 L and the discharge of 100 L are ideal, even if the supply of 99 L and the discharge of 99 L occur practically by errors of flow measurement, it is sufficient that both of the supply and the discharge are 99 L. That is, the errors are counterbalanced by using the single flowmeter. When the two flowmeters are separately provided as in the conventional art, if the respective absolute flow rates are different from each other, the balance between supply and discharge is lost, resulting in an uncontrollable situation.

Further, because the flowmeter is disposed between the two flow resistors in the chamber, the concentrated seawater and the seawater both flow uniformly, and thus the volume of the seawater pushed by the concentrated seawater or the volume of the concentrated seawater pushed by the seawater, i.e., the volumetric flow rate can be measured accurately by the flowmeter. Therefore, the pipe provided as an entrance interval before and after the flowmeter becomes unnecessary.

Figure 2:
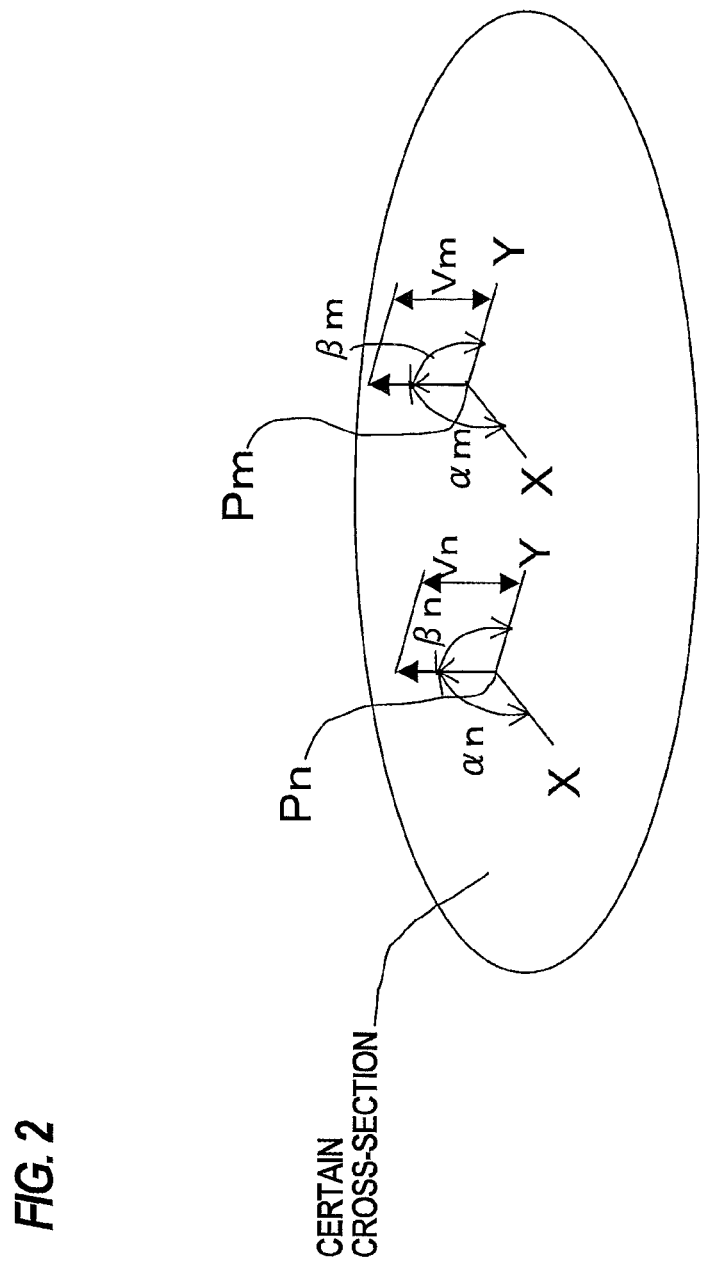
FIG. 2 is a view showing flows at arbitrary points Pn, Pm on the certain cross-section in a chamber.

Here, a uniform flow of fluid means that velocities and directions of fluid flow are uniform in a certain cross-section of the chamber. Specifically, the case where flow velocity of fluid (scalar) and flow direction of fluid (vector) in a certain cross-section of the chamber are identically distributed at any position in the cross-section is defined as a completely uniform flow of fluid. Specifically, as shown in FIG. 2, flows at arbitrary points Pn, Pm in the certain cross-section are shown by arrows representing flow magnitudes which are Vn, Vm, respectively. In this case, when angles ($\alpha$, $\beta$) between the arrows and the auxiliary lines X, Y (X is perpendicular to Y) on the cross-section are the same ($\alpha_n = \alpha_m$, $\beta_n = \beta_m$), the flows at the points Pn, Pm are defined as a uniform flow. When the angles $\alpha$, $\beta$ are the same at any position in the cross-section, such flow is defined as a completely uniform flow of fluid. The condition of being closer to this state is defined hereinafter as a uniform flow. In particular, when the cross-section exists as a geometrical arrangement where the cross-section is perpendicular to a cylindrical chamber with the outer circumferential wall or a chamber axis, the cross-section is a horizontal cross-section. In this case, as both the angles $\alpha$, $\beta$ become closer to a right angle, more uniform flow is formed.

Figure 3:
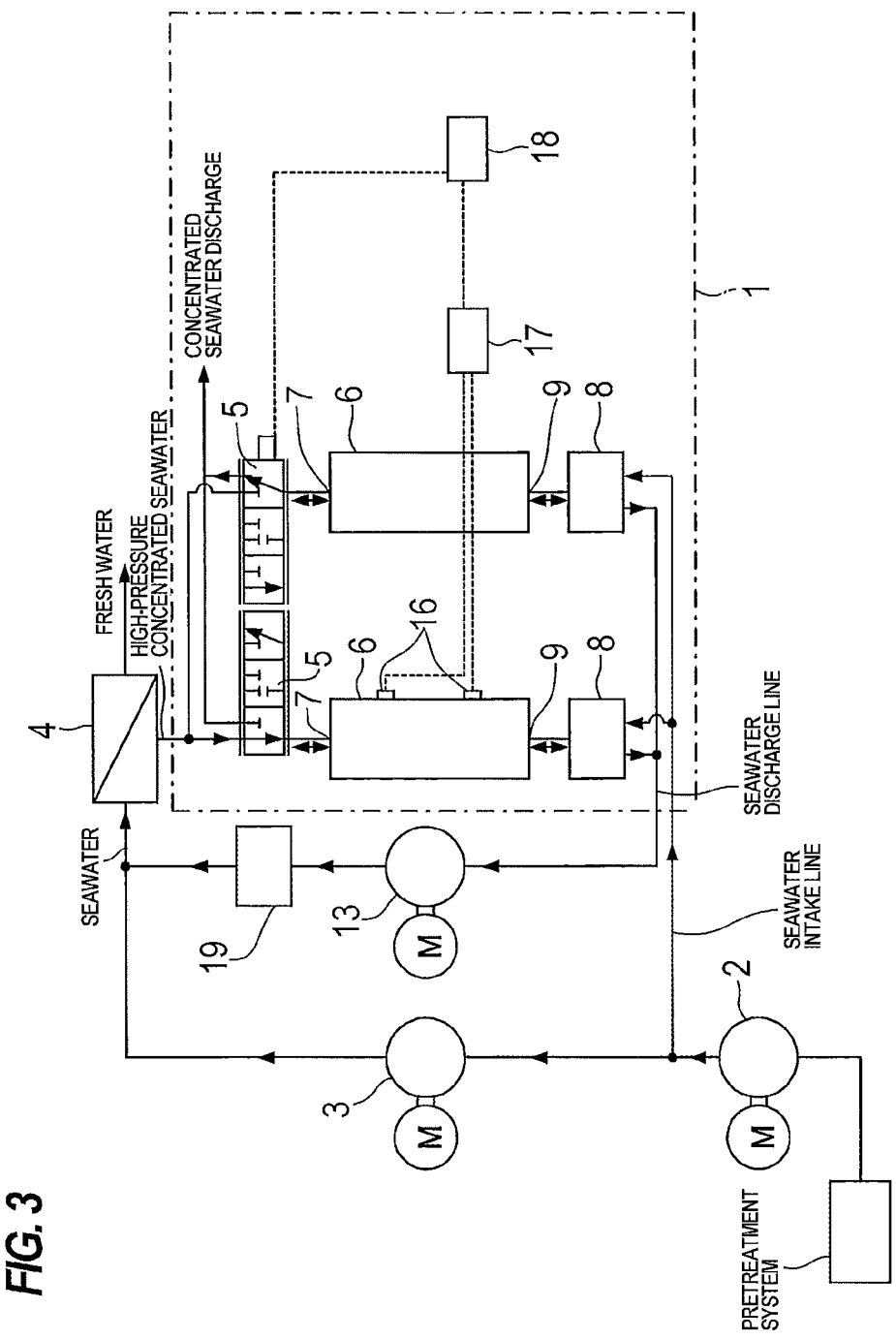
FIG. 3 is a schematic view showing a configuration example of a seawater desalination system and an energy recovery device according to the present invention in which a flowmeter comprises an ultrasonic flowmeter.
Figure 4:
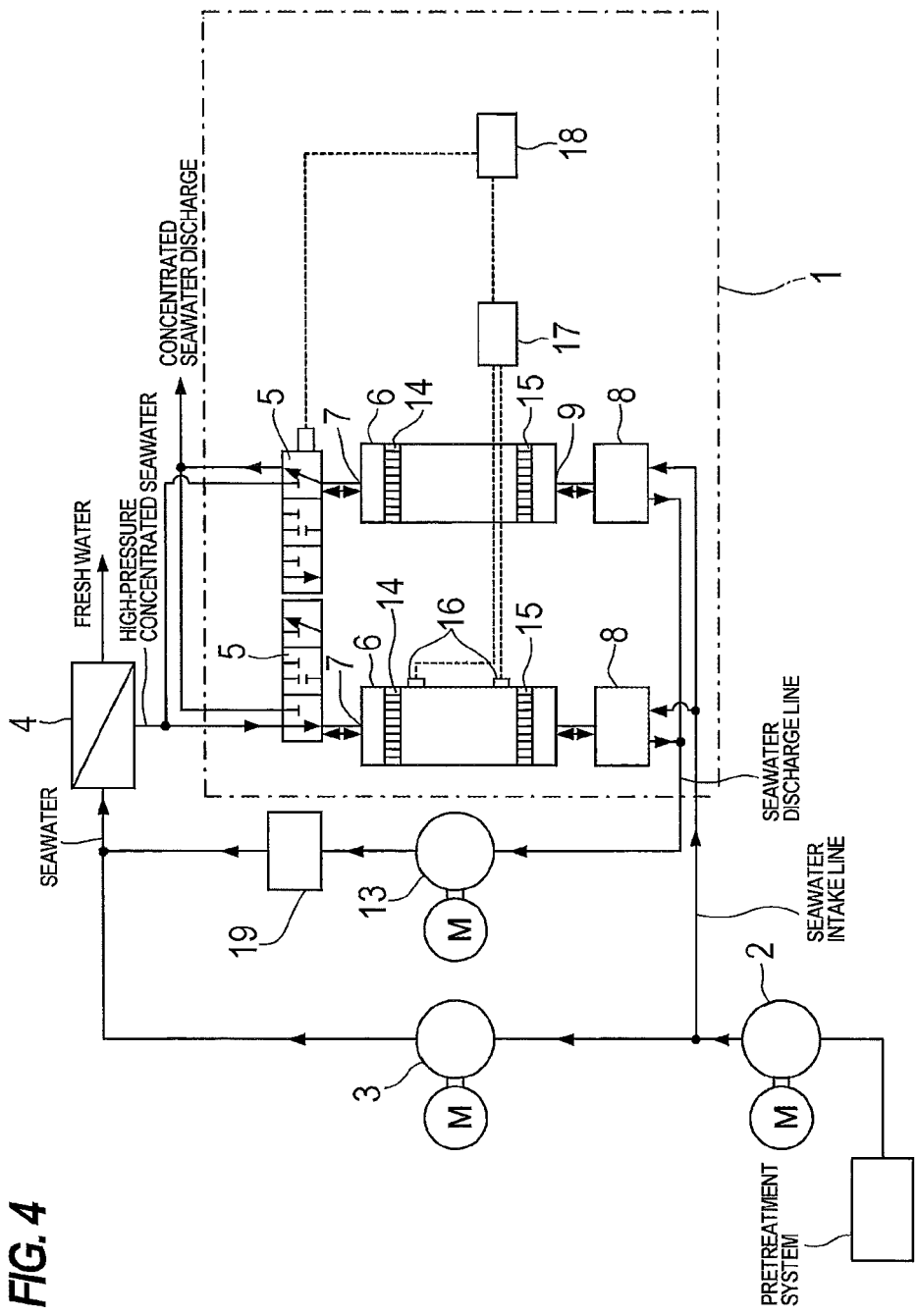
FIG. 4 is a schematic view showing a configuration example of a seawater desalination system and an energy recovery device according to the present invention in which a flowmeter comprises an ultrasonic flowmeter.

FIGS. 3 and 4 are schematic views showing configuration examples of a seawater desalination system and an energy recovery device according to the present invention in which a flowmeter comprises an ultrasonic flowmeter. Here, the seawater desalination system and the energy recovery device are substantially identical in configuration and operation to those described in FIG. 1.

However, both of the seawater desalination systems shown in FIGS. 3 and 4 have two pressure exchange chambers 6, and the pressure exchange chambers 6 used in the seawater desalination systems have no piston. As shown in FIGS. 3 and 4, an ultrasonic flowmeter 16 is attached to one of the two pressure exchange chambers 6.

FIG. 3 shows an embodiment in which any flow resistor is not used in the pressure exchange chamber, and FIG. 4 shows an embodiment in which flow resistors are used in the pressure exchange chamber.

Figure 5:
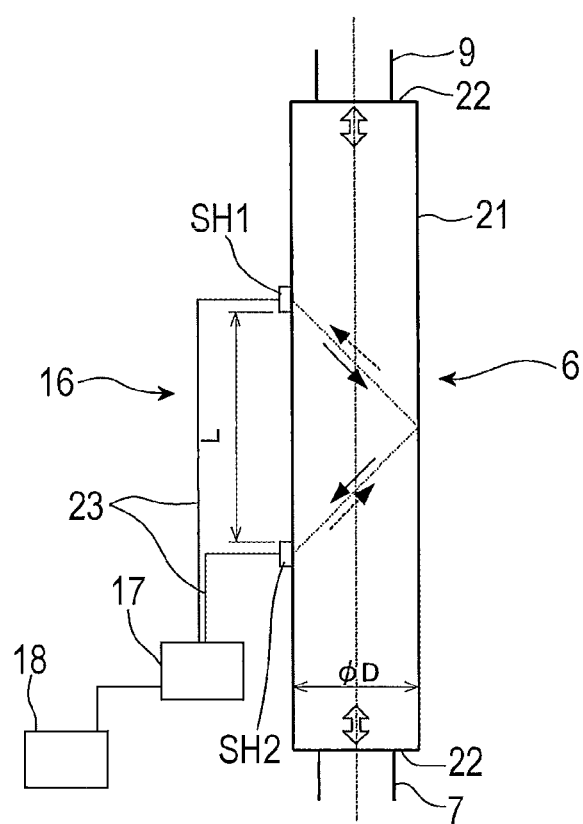
FIG. 5 is a schematic cross-sectional view showing a pressure exchange chamber having an ultrasonic flowmeter according to the present invention which is applied to the energy recovery device shown in FIG. 3.

FIG. 5 is a schematic cross-sectional view showing a pressure exchange chamber having an ultrasonic flowmeter according to the present invention which is applied to the energy recovery device shown in FIG. 3.

The two pressure exchange chambers used in the energy recovery device shown in FIG. 3 have the same configuration, except for the presence or absence of the flowmeter. Specifically, as shown in FIG. 5, the pressure exchange chamber 6 comprises a long chamber body 21 having a cylindrical shape, and end plates 22, 22 for closing both opening ends of the chamber body 21, and has a hollow interior. A concentrated seawater port 7 is forming in one of the end plates 22 and a seawater port 9 is formed in the other of the end plates 22, and the seawater and the concentrated seawater are supplied to and discharged from the chamber through these ports.

In the desalination systems shown in FIGS. 3 and 4, when the concentrated seawater in the two pressure exchange chambers 6, 6 is discharged to the outside of the chambers by the respective switching valves 5 and is depressurized down to atmospheric pressure, the seawater is supplied to the respective chambers from the seawater ports 9 via the directional control valves 8. The seawater supplied from the seawater ports is filled while pushing out the concentrated seawater in the respective chambers. At this time, in the pressure exchange chamber 6 having the flowmeter 16, the flowmeter 16 measures a flow rate of liquid passing through the chamber. The information measured by the flowmeter is transmitted to the device controller 18 directly from the flowmeter or via the sensor controller 17. Then, when a predetermined flow rate or integrated flow rate is counted, the device controller 18 controls the switching valves of the respective pressure exchange chambers 6, for example, the switching valves 5 which have been discharging the concentrated seawater so that the discharge of the concentrated water is stopped.

Then, the respective switching valves 5 are switched so that the high-pressure concentrated seawater separated from the reverse-osmosis membrane-separation apparatus 4 is supplied to the respective pressure exchange chambers 6. The high pressure-concentrated seawater supplied to the pressure exchange chamber 6 moves while pressurizing the seawater and pushing out the seawater. At this time, in the pressure exchange chamber 6 having the flowmeter 16, the flowmeter measures the flow rate of liquid passing through the chamber. The measurement information of the flowmeter 16 is transmitted to the device controller 18 directly from the flowmeter 16 or via the sensor controller 17. Then, when a predetermined flow rate or integrated flow rate is counted, the device controller 18 controls the switching valve of each pressure exchange chamber 6, for example, the switching valve 5 which has been supplying the concentrated seawater so that the supply of the concentrated seawater is stopped. In this manner, by the operation of each switching valve 5, supply of the concentrated seawater to the pressure exchange chamber 6 and discharge of the concentrated seawater from the pressure exchange chamber 6 are repeated.

In the energy recovery device 1, both of the two pressure exchange chambers 6 are installed such that the longitudinal direction of the chambers are arranged in a vertical direction. Each of chambers is arranged vertically in consideration of the effect of a difference in specific gravity between the concentrate seawater and the seawater, and the port for the concentrated seawater having large specific gravity is disposed at a lower part of the chamber and the port for the seawater having small specific gravity is disposed at an upper part of the chamber. That is, the long chamber body 21 having a cylindrical shape is installed such that a longitudinal direction (axial direction) of the chamber is placed in a vertical direction. The concentrated seawater port 7 is provided so as to supply and discharge the concentrated seawater at the lower part of the chamber, and the seawater port 9 is provided so as to intake and discharge the seawater at the upper part of the chamber.

As shown in FIG. 5, in the pressure exchange chamber 6 which has the ultrasonic flowmeter 16, a sensor head SH1 and a sensor head SH2 of the ultrasonic flowmeter 16 are attached to a cylindrical outer circumferential surface of the chamber body 21. These sensor heads SH1 and SH2 are Clamp-On type in which transmitting and receiving units of ultrasonic waves are attached so as to be directed from the cylindrical outer circumferential surface of the chamber to the interior of the chamber, and are not brought into contact with the seawater and the concentrated seawater. The sensor head SH1 transmits ultrasonic waves at a predetermined angle with respect to a wall surface of the chamber from the cylindrical outer circumferential surface of the chamber, and the sensor head SH2 receives a signal reflected from the chamber wall surface at the opposite side. Simultaneously, the sensor head SH2 transmits ultrasonic waves at a predetermined angle with respect to the wall surface of the chamber from the cylindrical outer circumferential surface of the chamber, and the sensor head SH1 receives a signal reflected from the chamber wall surface at the opposite side. At this time, propagation time-delay in the respective waves caused by the fluid flowing in the chamber is generated, and the flow velocity and the flow rate of the fluid flowing between the sensor heads are detected from the propagation time-delay. This is measurement principle of the ultrasonic flowmeter for measuring the flow rate and the flow velocity. The distance between the two sensor heads is determined by the measured pipe diameter, pipe material, the kind of fluid to be measured, and the like, and the two sensor heads SH1, SH2 are spaced by the distance L and are fixed to the chamber wall surface. According to the circumstances, when the reflection of the ultrasonic waves cannot be utilized, the positional relationship in which the sensor head SH2 is placed on the chamber wall surface opposite to the surface of the sensor head SH1 is also possible. Further, the measuring method may be a Pulse-Doppler method or a propagation time difference method.

The ultrasonic flowmeter 16 comprises the sensor head SH1, the sensor head SH2, and the sensor controller 17, and the sensor controller 17 and the sensor heads SH1, SH2 are connected to each other by cables 23. The sensor controller 17 controls transmission/reception of ultrasonic waves of the two sensor heads SH1, SH2, calculates a flow velocity and a flow rate, displays the flow velocity and the flow rate, and outputs the measured values to the outside as output signals by analog signals or communications. Some sensor controllers per se have a function for calculating integrated flow rate, and in the case of utilizing such function, timing of integration is transmitted to the sensor controller and the integrated value as the measured value is outputted to the outside as an output signal.

The signals outputted from the sensor controller 17 to the outside are inputted to the device controller 18 for controlling the energy recovery device 1, and the device controller 18 controls switching timing and opening of the switching valve 5 for switching supply of the concentrated seawater and discharge of the concentrated seawater on the basis of the flow velocity, the flow rate and the integrated flow rate data of the fluid flowing in the chamber, received from the sensor.

Figure 6:
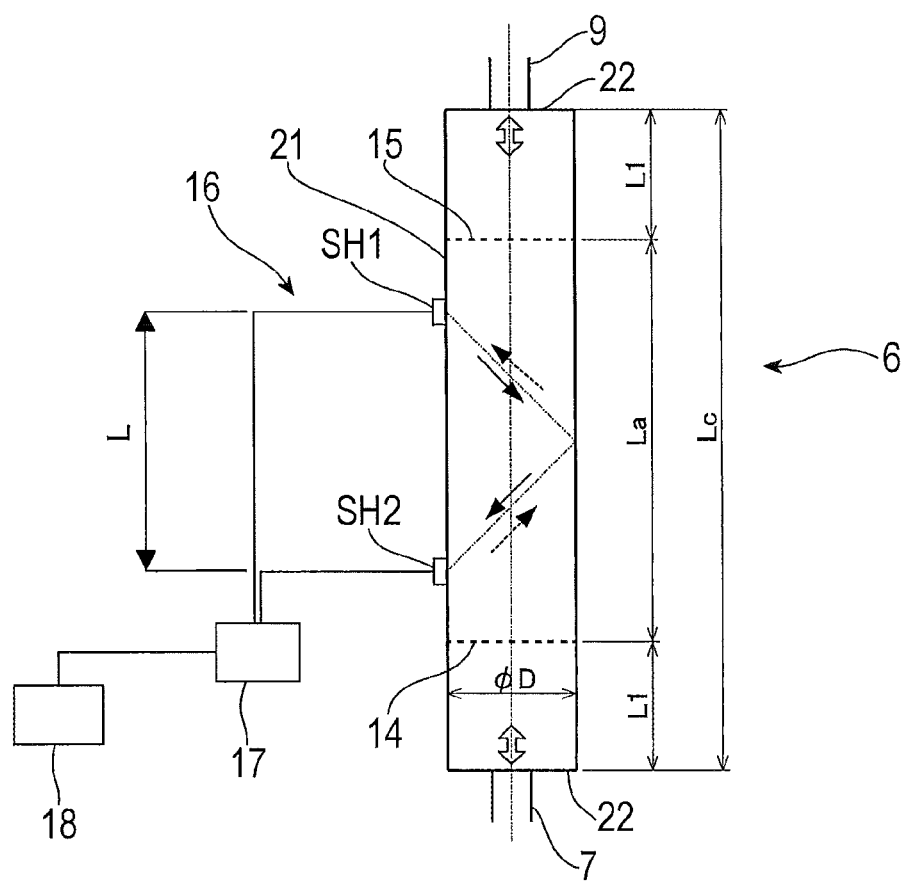
FIG. 6 is a view showing a pressure exchange chamber which includes a flow resistor located at the concentrated seawater port side and configured to regulate the flow of the supplied concentrated seawater, and a flow resistor located at the seawater port side and configured to regulate the flow of the supplied seawater, in addition to the pressure exchange chamber shown in FIG. 5.

The pressure exchange chamber 6 shown in FIG. 6 includes a flow resistor 14 located at the concentrated seawater port side and configured to regulate the flow uniformity of the supplied concentrated seawater and a flow resistor 15 located at the seawater port side and configured to regulate the flow uniformity of the supplied seawater, in addition to the pressure exchange chamber shown in FIG. 5. In the pressure exchange chamber 6 shown in FIG. 6, the concentrated seawater port 7 and the seawater port 9 have much smaller diameters, compared to the inner diameter of the pressure exchange chamber, than those ports of the pressure exchange chamber 6 shown in FIG. 5, and thus the concentrated seawater and the seawater supplied to the chamber from the respective ports having small diameters become the fluid flows having a partially large velocity distribution around the ports in the chamber. Thus, the fluid flows are dispersed in a diametrical direction of the chamber by the flow resistor 14 and the flow resistor 15, and are regulated to form a uniform flow in the cross-section of the chamber. Therefore, two fluids are pushed and pulled in such a state that the interface between the seawater and the concentrated seawater is maintained horizontally, and thus the energy transmission is performed while maintaining the state in which the seawater and the concentrated seawater having different salt concentrations are less likely to be mixed in the chamber.

The flow resistors apply suitable flow resistance to the flow of fluid flowing in at a high speed from the respective ports, and regulate the flow of fluid so that the flow of fluid is uniformized in the chamber. By these flow resistors, turbulence in a boundary region where the concentrated seawater and the seawater are brought in direct contact with each other is eliminated, and mixing of the concentrated seawater and the seawater in the pressure exchange chamber can be suppressed. In addition to this operation and effect, in measuring the flow velocity and the flow rate by the ultrasonic flowmeter, the flow of fluid at the measurement location in the central part of the chamber becomes uniform, and thus measurement accuracy and reproducibility are improved.

Here, as an embodiment of the flow resistor, the flow resistor comprises a circular plate member in which at least one hole is formed. It is preferable that one or more flow resistors are disposed respectively at the seawater port side and the concentrated seawater port side in the pressure exchange chamber, and any flow resistor is disposed so as to allow a plate surface of the flow resistor to be parallel to a plane perpendicular to a cylindrical axis of the chamber, thereby achieving simple and sufficient flow-regulation effect.

Figure 7A:
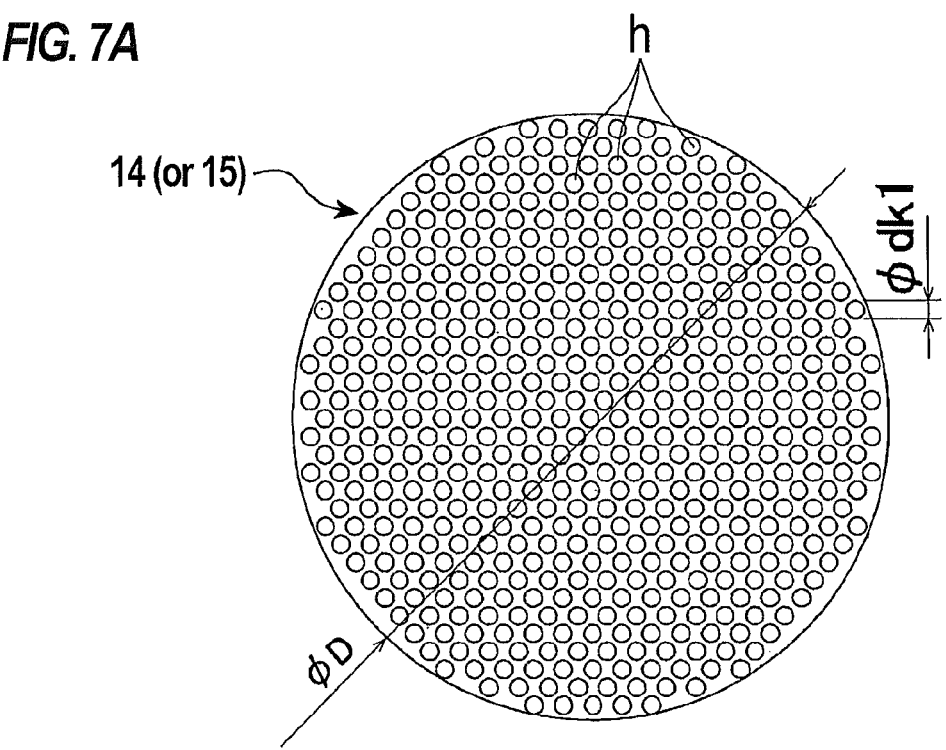
FIG. 7A is a plan view showing a configuration example of the flow resistor.
Figure 7B:
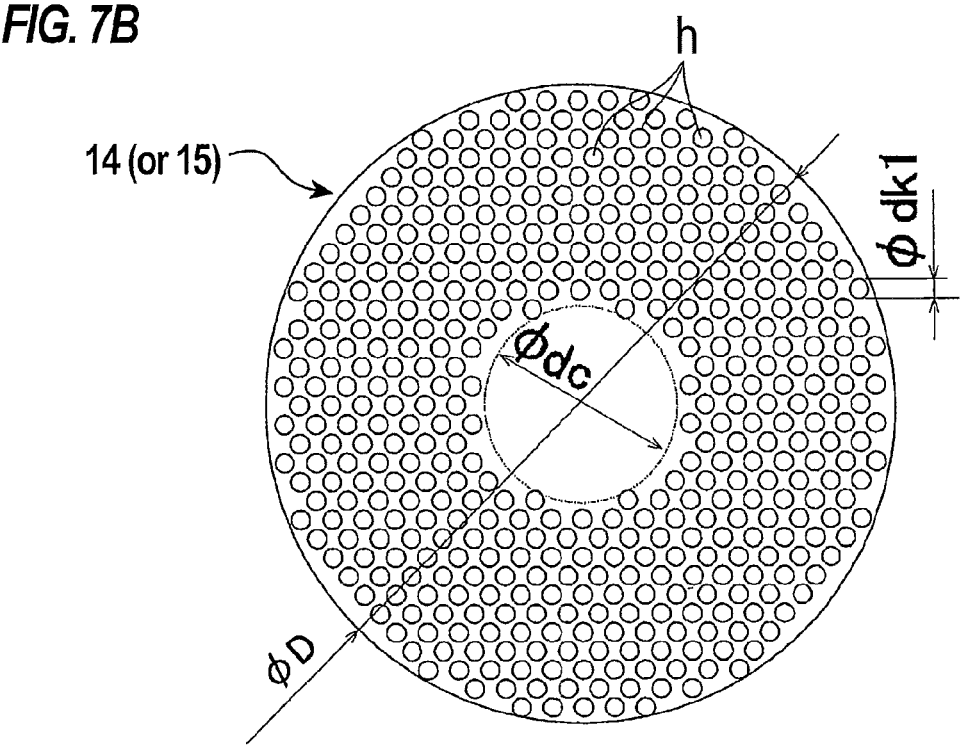
FIG. 7B is a plan view showing a configuration example of the flow resistor.

FIGS. 7A and 7B are plan views showing configurations of the flow resistors. The flow resistor 14 (or 15) shown in FIG. 7A comprises a circular plate having an outer diameter ($\varphi D$) substantially equal to an inner diameter of the chamber, and small holes h having a diameter $\varphi dk1$ are formed over the entire surface of the circular plate. The flow resistor 14 (or 15) shown in FIG. 7B comprises a circular plate having an outer diameter ($\varphi D$) substantially equal to an inner diameter of the chamber and has a central circular portion (portion of diameter $\varphi dc$) which has plane surface so as to block the flow there through, and small holes h having a diameter $\varphi dk1$ are formed at an outer circumferential portion except for the central circular portion.

One or more plate-like flow resistors shown in FIGS. 7A and 7B are disposed respectively at the seawater port side and the concentrated seawater port side in the pressure exchange chamber.

As shown in FIG. 7B, the flow resistor in which only the central circular portion is blocked is effective in the case where the seawater port and the concentrated seawater port have considerably smaller diameters compared to the chamber diameter and the high-speed fluid flows in the chamber from each port. Further, the flow resistor in which only the central circular portion is blocked as shown in FIG. 7B may be disposed near each port, and the flow resistor in which holes having a small diameter are formed over the entire surface thereof as shown in FIG. 7A may be disposed at the central side of the chamber, and the two or more flow resistors may be disposed at the respective port sides.

In FIGS. 3 to 6, the embodiments in which the single concentrated seawater port and the single seawater port are provided for each the pressure exchange chamber, and the switching valve or the directional control valve is connected to each single port are illustrated. It is obvious that each of the concentrated seawater ports and the seawater ports comprises two ports, one port only for supplying and another port only for discharging, and an opening and closing valves are connected to one of the port for supplying and the port for discharging, thereby performing the same operation as described above.

Further, although an example in which the flowmeter is provided in one of the two pressure exchange chambers is illustrated, even if the flowmeters are provided in the two pressure exchange chambers, some of the technical problems of the present invention can be solved. Similarly, the pressure exchange chamber using the electromagnetic flowmeter shown in FIG. 14 (described later) may solve some technical problems of the present invention.

Figure 8A:
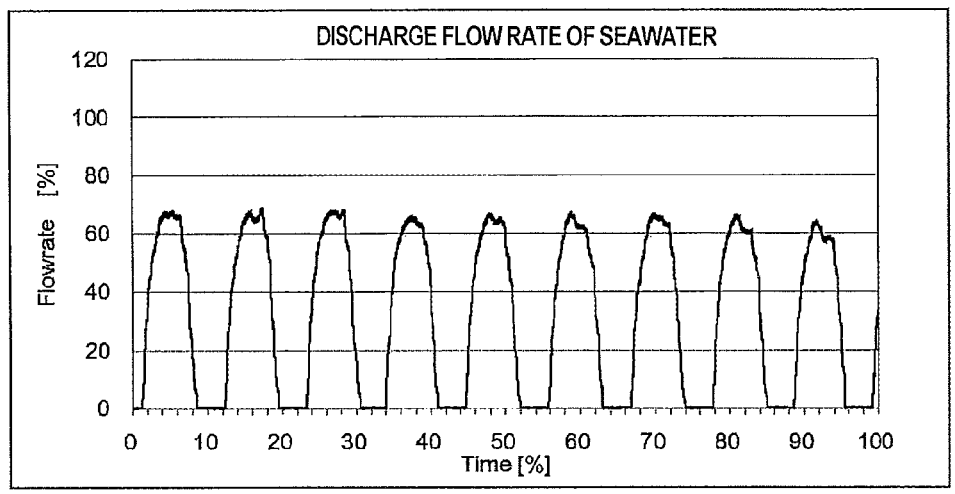
FIG. 8A is a graph showing an example of measured values by the ultrasonic flowmeter in the operation of the energy recovery device.
Figure 8B:
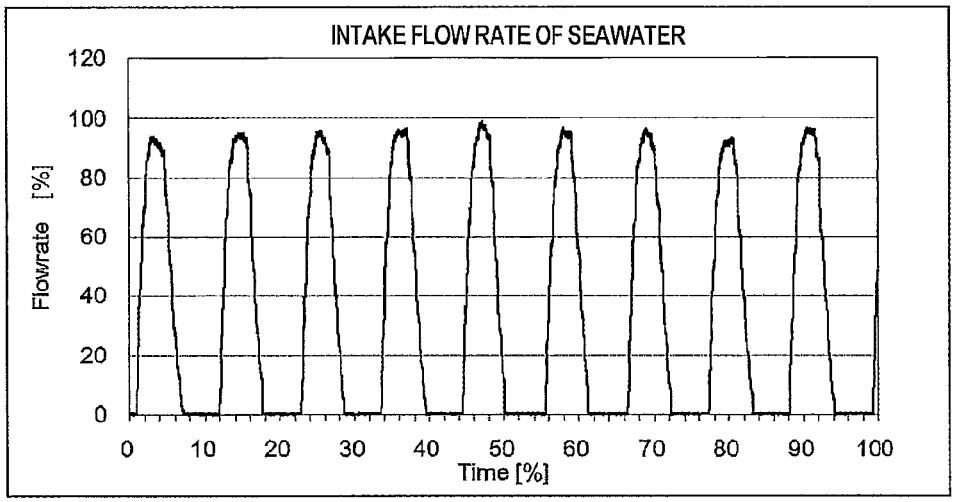
FIG. 8B is a graph showing an example of measured values by the ultrasonic flowmeter in the operation of the energy recovery device.

FIGS. 8A and 8B are graphs showing an example of measured values by the ultrasonic flowmeter in the operation of the energy recovery device.

FIG. 8A shows a flow rate at the time of seawater discharge, and FIG. 8B shows a flow rate at the time of seawater intake. In FIGS. 8A and 8B, the horizontal axis represents time and the vertical axis represents a flow rate value.

The flow at the time of seawater intake and the flow at the time of seawater discharge are in opposite directions, but the flows in both directions can be measured by a set of ultrasonic flowmeter attached to one pressure exchange chamber. The data shown in FIGS. 8A and 8B show data measured in one direction (at the time of seawater discharge or at the time of seawater intake) in order to represent flow rates in both directions individually.

As shown in FIG. 8A, the waveform at the seawater discharge phase has a low wave peak and a broad wave width. This is because in order to keep the discharge amount of seawater from the plural chambers constant as a whole, the flow of fluid of one chamber is controlled such that the discharge flow rate corresponding to the foot portion (time) of the chevron waveform where the flow is disconnected overlaps with the discharge flow of another chamber and consequently seawater is discharged from two chambers at the same time.

As shown in FIG. 8B, because the intake time of the seawater at the seawater intake phase is shorter than the discharge time of the seawater, in order to match the volume of the intake seawater and the volume of the discharge seawater at the discharge phase, it is necessary to take the seawater into the chamber in an amount equal to the discharge amount for a short period time, and thus the waveform has a high wave peak and a narrow wave width.

One chevron waveform corresponds to one cycle of the valve switching, and the control is performed such that the integrated value of flow rate in one cycle becomes the same both in the seawater discharge and in the seawater intake. Specifically, the area of the chevron waveform in the seawater discharge and the area of the chevron waveform in the seawater intake correspond to the discharge volume from the chamber and the intake volume to the chamber, respectively, and the control is performed such that the area of the chevron waveform in the seawater discharge and the area of the chevron waveform in the seawater intake are matched.

Figure 9:
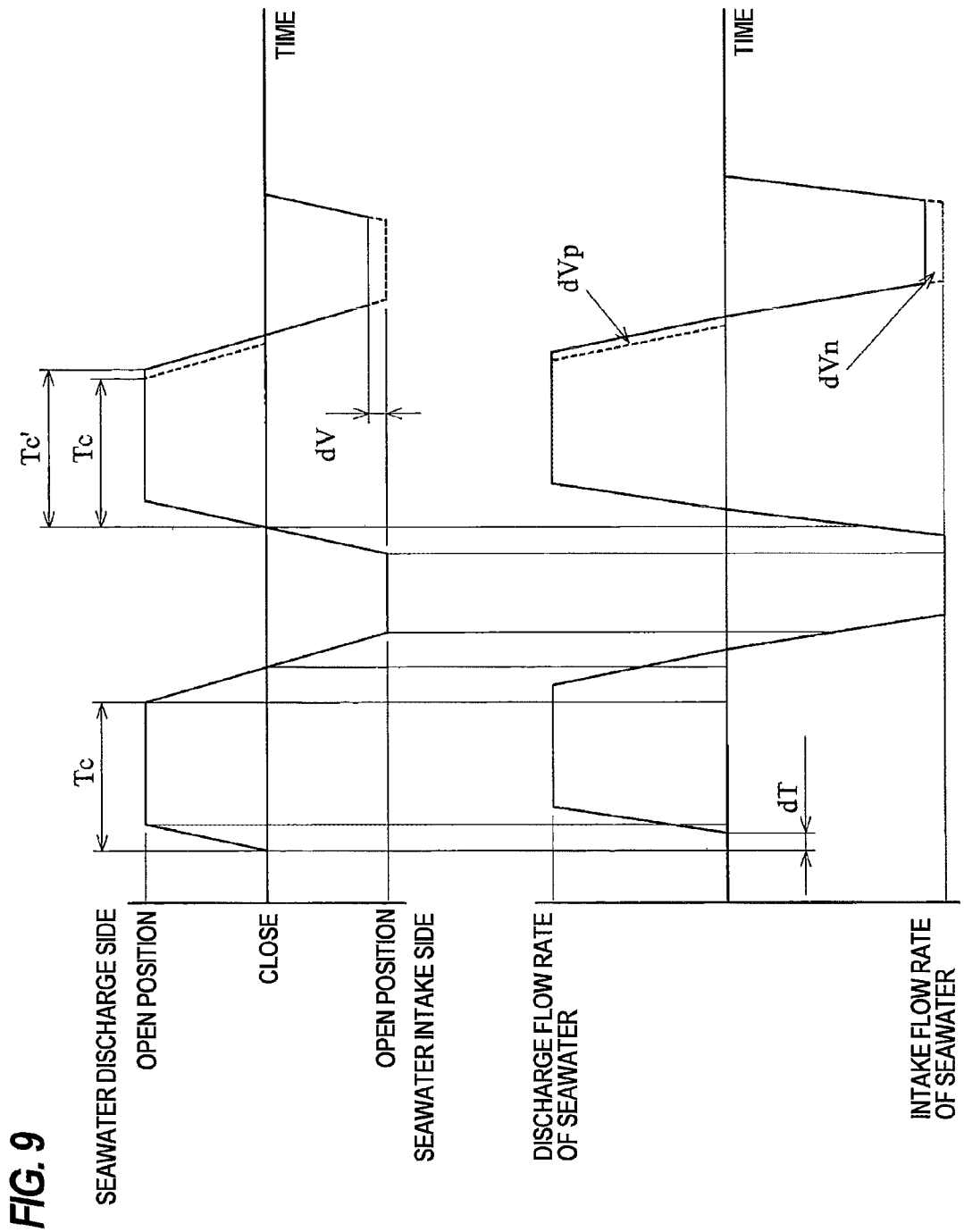
FIG. 9 is a graph schematically showing operation of the switching valve and the flow rate data.

FIG. 9 is a graph schematically showing operation of the switching valve and the flow rate data. The control of the switching valve and the flow rate data will be described on the basis of FIG. 9.

In the upper graph of FIG. 9, the horizontal axis represents time, and the vertical axis represents valve opening, and the valve opening shows opening at the seawater discharge side above the center line on which the valve is closed and shows opening at the seawater intake side below the center line. When the valve is opened in a trapezoidal waveform as shown in FIG. 9, the concentrated seawater flows into the chamber, and thus the seawater is discharged from the chamber to the outside. The flow rate of the seawater at this time appears after slight time-delay dT after start time of open of the valve, and the flow rate becomes constant when the valve opening reaches a predetermined opening. The flow rate at this time is time-integrated, and the integrated value and a volume target value preset in the device controller are compared with each other, and if the integrated value is smaller than the volume target value, time Tc from start of open of the valve to start of close of the valve is increased at the subsequent cycle. As shown in FIG. 9, when the time is lengthened from Tc to Tc', the integrated value of the flow rate in the subsequent cycle increases by an amount corresponding to an increase of Tc. The seawater is discharged in a larger amount by the volume dVp corresponding to the area enclosed by the dashed line and the solid line in the graph of the flow rate than that in the previous cycle. In this manner, the set value preset in the controller is determined to be a volume target value, and discharge time is controlled to either increase or decrease so that the integrated value of the flow rate at the seawater discharge side, i.e., the discharge amount of seawater becomes the volume target value.

Then, in the seawater intake side, when the valve is opened toward the seawater intake side, the seawater flows into the chamber, and thus the concentrated seawater is pushed out to the outside of the chamber and the seawater is charged into the chamber. The flow rate of the seawater is measured by the same ultrasonic flowmeter. The flow rate of the seawater at this time appears after slight time-delay dT after start time of open of the valve, and the flow rate becomes constant when the valve opening reaches a predetermined opening. The flow rate at this time is time-integrated, and the integrated value and the most recently calculated integrated value at the discharge side are compared with each other, and if the integrated value is larger than the most recently calculated integrated value, the valve opening is decreased at the subsequent cycle. As shown in FIG. 9, when the valve opening of the subsequent cycle is made to be smaller than the valve opening of the previous cycle, the integrated value of the flow rate in the subsequent cycle is reduced and decreased because the valve opening is decreased. The seawater is taken into the chamber in a smaller amount by the volume dVn corresponding to the area enclosed by the dashed line and the solid line in the graph of the flow rate than that in the previous cycle. In this manner, the integrated value of the flow rate at the seawater intake side is compared with the most recent discharge volume of the seawater, and the valve opening is controlled so that the discharge amount and the intake amount become substantially the same.

Figure 10:
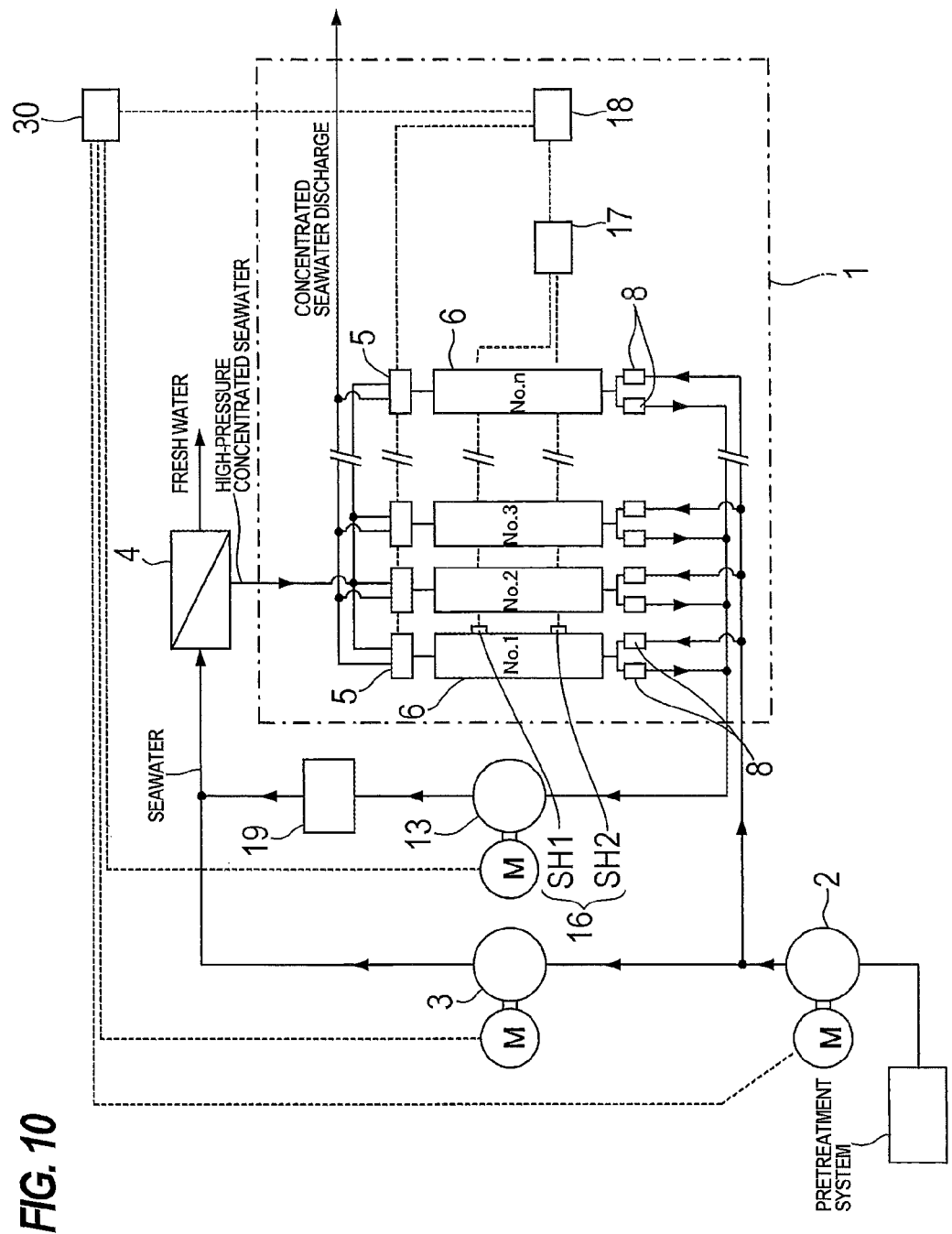
FIG. 10 is a schematic view showing a configuration example of a seawater desalination system and an energy recovery device according to the present invention.

FIG. 10 is a schematic view showing a configuration example of a seawater desalination system and an energy recovery device according to the present invention. Here, the seawater desalination system and the energy recovery device are substantially identical in configuration and operation to those described in FIGS. 3 and 4. FIG. 10 shows an embodiment of the energy recovery device comprising a plurality of pressure exchange chambers provided in parallel, and switching valves and directional control valves attached to the respective pressure exchange chambers. In FIG. 10, n (n is an integer of not less than 2) units of pressure exchange chambers are provided.

Further, there is provided a system controller 30 for operating and monitoring essential components constituting the system, i.e., the feed pump 2, the high-pressure pump 3, and the booster pump 13, and the device controller 18 of the energy recovery device 1 for controlling operation of the switching valves for supplying and discharging the liquid to the pressure exchange chambers 6 by receiving flow rate information obtained by measurement of the supply amount and the discharge amount of the pressure exchange chambers 6 in the energy recovery device 1 exchanges communication, signals, and the like with the system controller 30. The start and stop of the essential components including the energy recovery device is performed by instructions of the system controller 30, and the operation information of the respective components are centralized in the system controller 30. The system controller 30 performs optimum operation control of the seawater desalination system based on the information of the respective components.

In FIG. 10, all the n units of pressure exchange chambers have no piston. The ultrasonic flowmeter 16 is mounted on the outer circumferential portion of only one of the n pressure exchange chambers. The sensor heads SH1 and SH2 of the ultrasonic flowmeter 16 comprise a pair of transmitter and receiver, and are connected to the sensor controller 17 by respective cables. The signals outputted from the sensor controller 17 to the outside are transmitted to the device controller 18 for controlling the energy recovery device 1, and the device controller 18 performs signal calculation for controlling the switching timing and the opening of the switching valves 5 for controlling the concentrated seawater on the basis of the flow velocity, the flow rate and the integrated flow rate data of the fluid flowing in the chamber. The device controller 18 is connected to the switching valves 5 by cables for supplying electric power and the above control signals.

The state of flow in the pressure exchange chamber, i.e., the flow velocity, the flow rate and the integrated flow rate are measured by the single flowmeter (sensor) 16. Then, on the basis of the measured value of the flow velocity or the flow rate, or by utilizing the integrated flow rate value in the case where the integrated flow rate is calculated and outputted by the sensor controller 17, the integrated flow rate value at the seawater discharge side of the chamber is determined, and the set value preset in the controller is determined as a target value, and the discharge time is calculated from the integrated flow rate value and the target value. The calculated value is applied to the control of the pressure exchange chambers to which the sensor is not attached. Specifically, the calculated value of the No. 1 pressure exchange chamber is applied to No. 2, No. 3 . . . No. n pressure exchange chambers. At the subsequent operation of the No. 1 pressure exchange chamber, the discharge time is calculated again from the integrated flow rate, and the control of all the pressure exchange chambers is performed, thereby controlling so that the discharge amount becomes the target value.

Also, in the flow rate at the seawater intake side, the integrated flow rate value of the No. 1 pressure exchange chamber is calculated in the same manner, and the valve openings of No. 2, No. 3 . . . No. n pressure exchange chambers are changed based on the calculated value. Then, the integrated flow rate value of seawater intake is calculated again at the subsequent operation of the No. 1 pressure exchange chamber, and operation control of the switching valves corresponding to the respective pressure exchange chambers is performed in the same manner, thereby controlling so that the discharge amount and the intake amount become substantially the same. Specifically, the flow rate of one pressure exchange chamber is measured as a standard unit, and the valve switching and opening control of other pressure exchange chambers can be controlled in a dependent manner on the basis of the measured flow rate of the one pressure exchange chamber as the standard unit.

Both of the switching valve for supply and discharge of the concentrated seawater and the switching valve for intake and discharge of the seawater may be configured to be operated by the control signals or the like from the device controller. Further, each of the pressure exchange chambers preferably comprises the pressure exchange chamber described in the embodiments shown in FIGS. 1, 5 and 6.

Figure 11:
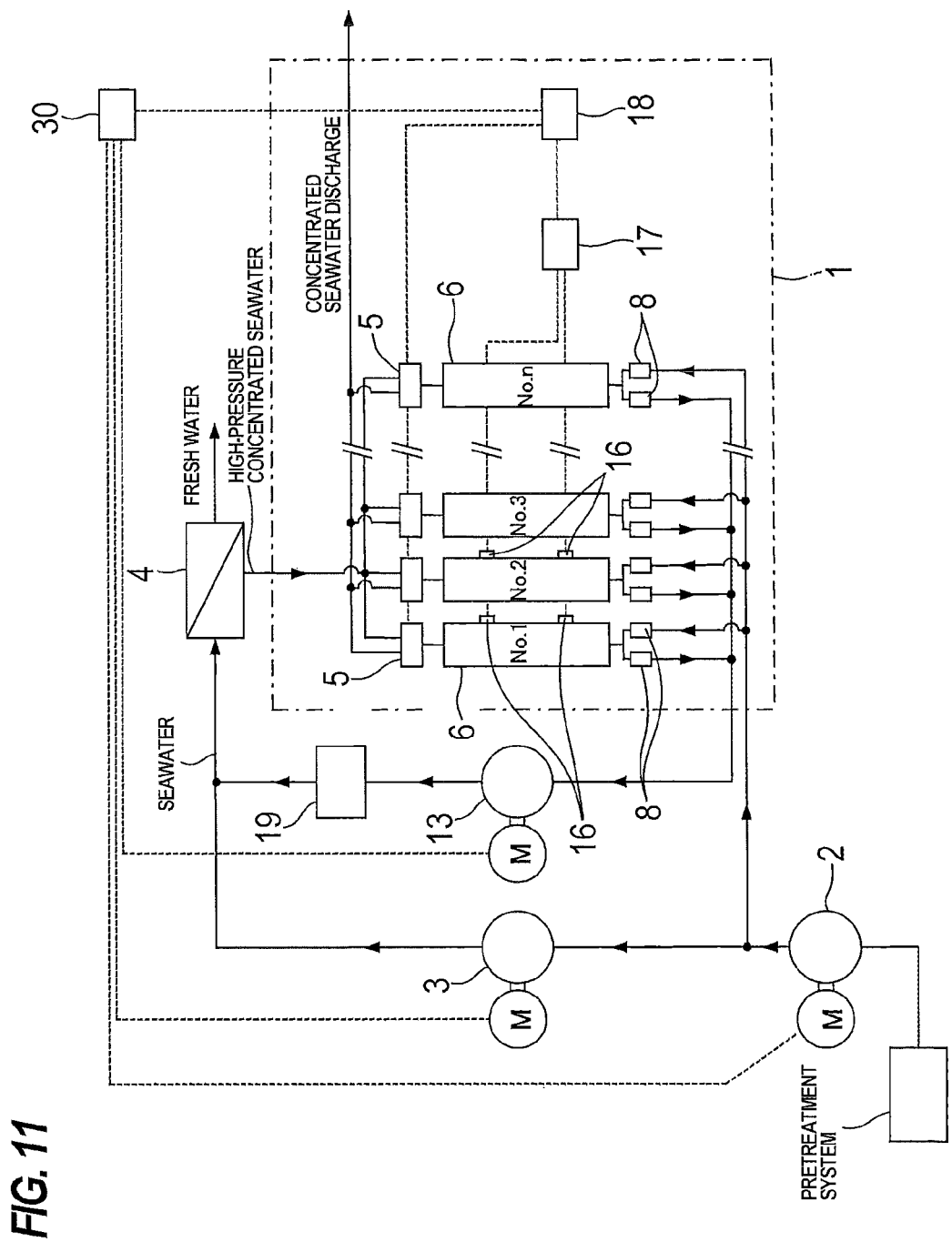
FIG. 11 is a schematic view showing an embodiment in which ultrasonic flowmeters are installed in only two pressure exchange chambers of No. 1 and No. 2, in addition to the system shown in FIG. 10.

FIG. 11 is a schematic view showing an embodiment in which ultrasonic flowmeters are installed in only two pressure exchange chambers of No. 1 and No. 2, in addition to the system shown in FIG. 10.

A method for controlling n pressure exchange chambers by utilizing the flow velocity, the flow rate and the integrated flow rate value measured by an ultrasonic flowmeter attached to one (for example, No. 1) pressure exchange chamber on the basis of the measured values is the same as the controlling method described in FIG. 10. The control calculation by using the measured values of the ultrasonic flowmeter attached to one (No. 2) of other pressure exchange chambers is the same as the control calculation by using the measured values of the ultrasonic flowmeter attached to the former (No. 1) pressure exchange chamber in the device controller. The control of the device is performed based on one of the control calculations. In the case of a sensor failure of the ultrasonic flowmeter which is being used for the control, the ultrasonic flowmeter is switched to another ultrasonic flowmeter to continue operation of the system. That is, another ultrasonic flowmeter is used for backup. The failure of the sensor controller can be detected by utilizing error output function such as cable cutting provided in a sensor controller itself.

Further, the measured values of the ultrasonic flowmeter attached to one of the pressure exchange chambers and the measured values of the ultrasonic flowmeter attached to the other one of the pressure exchange chambers are taken into the device controller, and control calculation is performed on the basis of the respective measured values by the same control method. The measured values and the integrated flow rate values, and the results of control calculation in the two ultrasonic flowmeters should be substantially the same, but if the measured values and the results of control calculation obtained by the ultrasonic flowmeter used for control and the ultrasonic flowmeter used for backup are greatly different from each other, this difference can be considered as device error. In this manner, the measured values by the two ultrasonic flowmeters can be used for detection of abnormal or error state of the device in the device controller, without depending on the error output function provided in the sensor controller.

Figure 12:
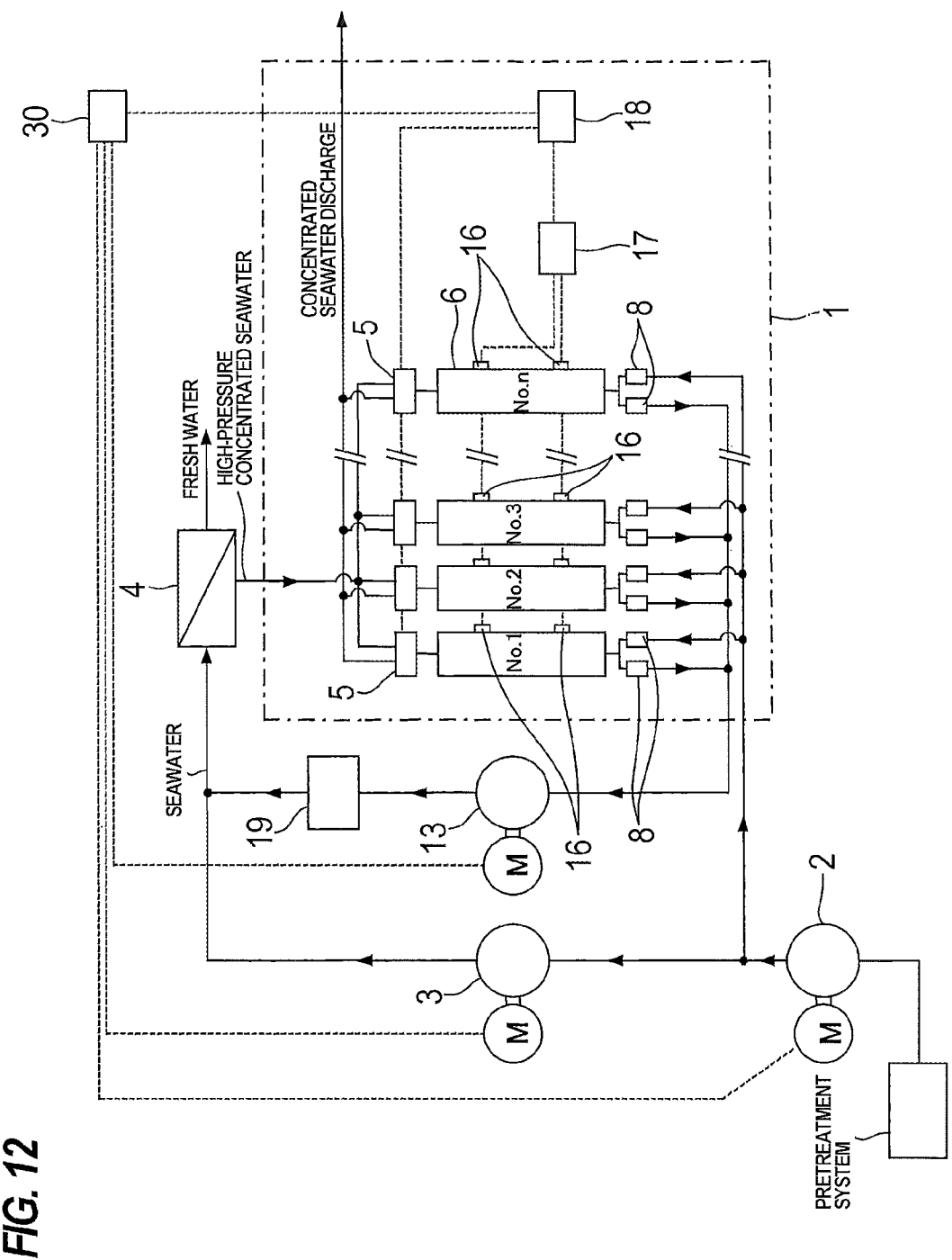
FIG. 12 is a schematic view showing an embodiment in which ultrasonic flowmeters are installed in all the pressure exchange chambers from No. 1 to No. n, in addition to the system shown in FIG. 10.

FIG. 12 is a schematic view showing an embodiment in which ultrasonic flowmeters are installed in all the pressure exchange chambers from No. 1 to No. n, in addition to the system shown in FIG. 10.

In the embodiment shown in the FIG. 12, the control of the chambers is performed by utilizing the flow velocity; the flow rate and the integrated flow rate value measured by the ultrasonic flowmeters 16 attached to the respective chambers. Specifically, the supply amount and the discharge amount of seawater from 1 cycle to (n−1) cycle are calculated, and the supply amount and the discharge amount are averaged respectively, and the switching time and valve opening of the switching valve of the pressure exchange chambers are adjusted in the subsequent cycle. According to this control method, the response to an accidental noise or the like to the sensor can be insensitive, and thus the control of device becomes less subjected to unexpected disturbance.

Figure 13:
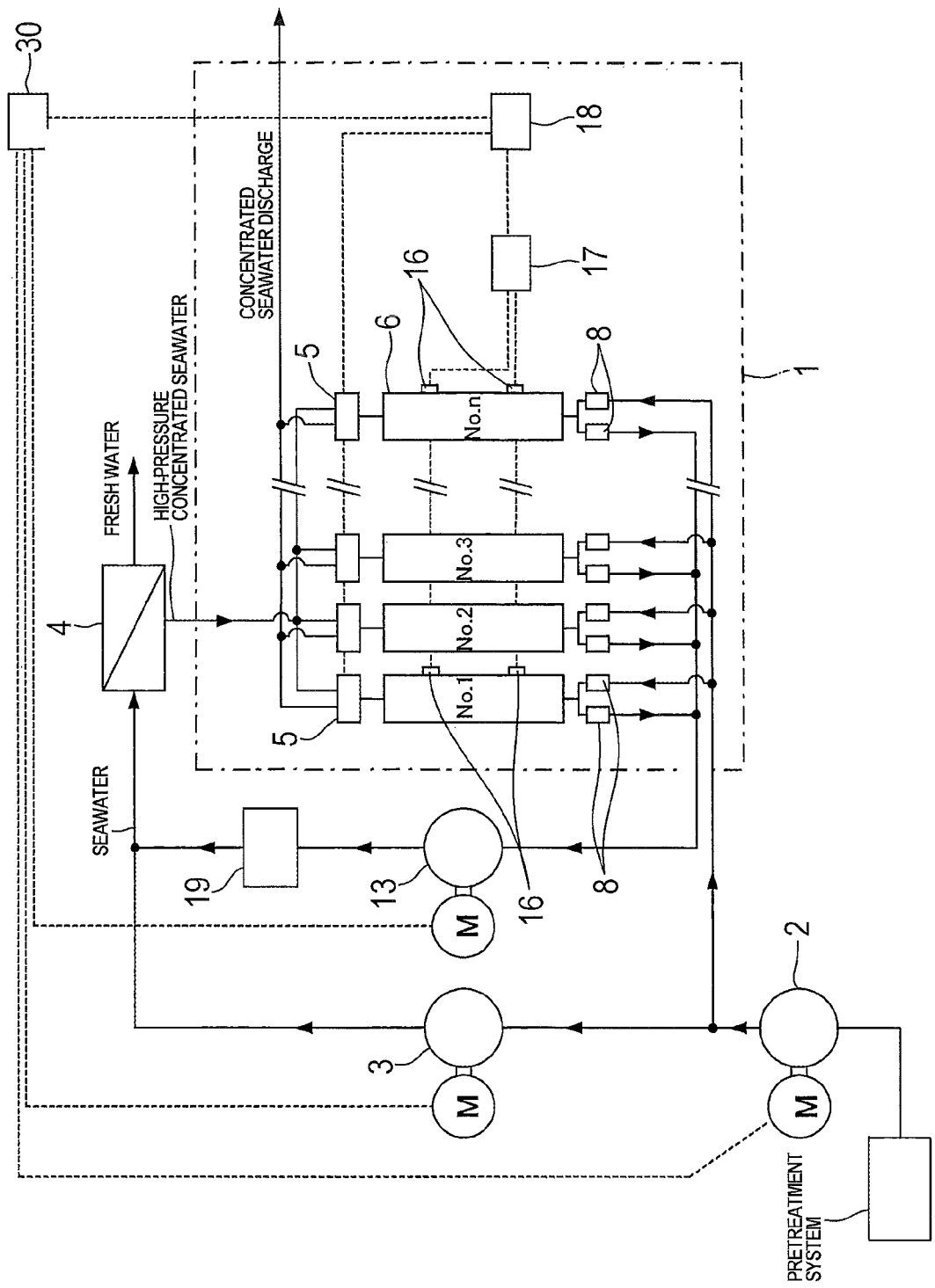
FIG. 13 is a schematic view showing an embodiment in which ultrasonic flowmeters are provided in a pressure exchange chamber of No. 1 and an arbitrary pressure exchange chamber, in addition to the system shown in FIG. 10.

FIG. 13 is a schematic view showing an embodiment in which ultrasonic flowmeters are provided in a pressure exchange chamber of No. 1 and an arbitrary pressure exchange chamber, in addition to the system shown in FIG. 10.

In FIG. 13, the ultrasonic flowmeters 16 are provided on No. 1 and No. n pressure exchange chambers. When the flow rate processed in the energy recovery device becomes large, i.e. capacity of desalination plant becomes large, the number of pressure exchange chambers to be installed increases, and thus the seawater and the concentrated seawater are supplied to many pressure exchange chambers. Therefore, the seawater and the concentrated seawater are distributed to the respective pressure exchange chambers by branch pipes from the respective main pipes. The slight flow rate difference between the flow rates supplied to the pressure exchange chambers is generated depending on whether the relationship between the position of supply port of the seawater or the concentrated seawater supplied to the main pipe and the connecting position of the branch pipe connected to the main pipe is close or distant. Because the seawater or the concentrated seawater supplied to the plural chambers passes through the upstream side of the branch pipe, the seawater or the concentrated seawater flows through the main pipe in a large amount at a high speed, and thus the pressure of the upstream side of the main pipe becomes lower than the pressure of the downstream side of the main pipe. The flow rate to the chamber disposed at the upstream branch pipe is smaller than that at the downstream branch pipe, and the flow rate to the chamber disposed at the downstream branch pipe is larger than that at the upstream branch pipe. That is, the flow rate to the No. n pressure exchange chamber is larger than the flow rate to the No. 1 pressure exchange chamber.

Therefore, of the pressure exchange chambers, the ultrasonic flowmeter 16 is mounted on the pressure exchange chamber (for example, No. n) in which the supply amount and the discharge amount of the seawater are the largest, and other pressure exchange chambers are controlled in accordance with the pressure exchange chamber having the ultrasonic flowmeter 16. The No. 1 and No. n pressure exchange chambers on which the ultrasonic flowmeters 16 are mounted in FIG. 13 are determined such that chambers provided at the most downstream side of the main pipes, for example, the two main pipes exist. The pressure exchange chamber on which the ultrasonic flowmeter is mounted is changed depending on the arrangement of unit, layout, collecting pipes, and branch position to each unit, and thus are determined according to the characteristics of the desalination facility.

As described above, in the embodiments in which the plural pressure exchange chambers shown in FIGS. 10 to 13 are provided, since the ultrasonic flowmeter which can be attached to the pressure exchange chamber directly as an external unit is used, the flowmeter is not required to be pressure-resistant specification and corrosion-resistant specification, and the flow rate supplied to the pressure exchange chamber and the flow rate discharged from the pressure exchange chamber can be measured by the single flowmeter. Accordingly, calibration and correction of the two flowmeters conventionally conducted become unnecessary.

Further, in the pressure exchange chambers described in the embodiments shown in FIGS. 1, 5 and 6, all the chambers has the same shape and at least one of the chambers has a flowmeter, and hence the control of the chambers having no flowmeter can be performed with high accuracy. Therefore, it is not necessary to connect the flowmeter having a large diameter to the collecting pipe having a large diameter which collect the supply and discharge of the seawater or the concentrated seawater of the respective chambers. Accordingly, an extended pipe required at both end of flowmeter becomes unnecessary.

Further, about the flowmeter for backup, a large scale piping system is not required to be prepared unlike the conventional flowmeter having a large diameter for the backup. According to the present invention, normally, the replacement of only the ultrasonic flowmeter or the replacement of the pressure exchange chamber, or the attachment of one or more ultrasonic flowmeters to another pressure exchange chamber as in the embodiments shown in FIGS. 11 and 12, can easily deal with the backup.

In the embodiments shown in FIGS. 3 to 13, examples in which the ultrasonic flowmeter is used is illustrated. However, even if the ultrasonic flowmeter is replaced with the electromagnetic flowmeter, the great effect can be achieved compared to the conventional system.

Figure 14:
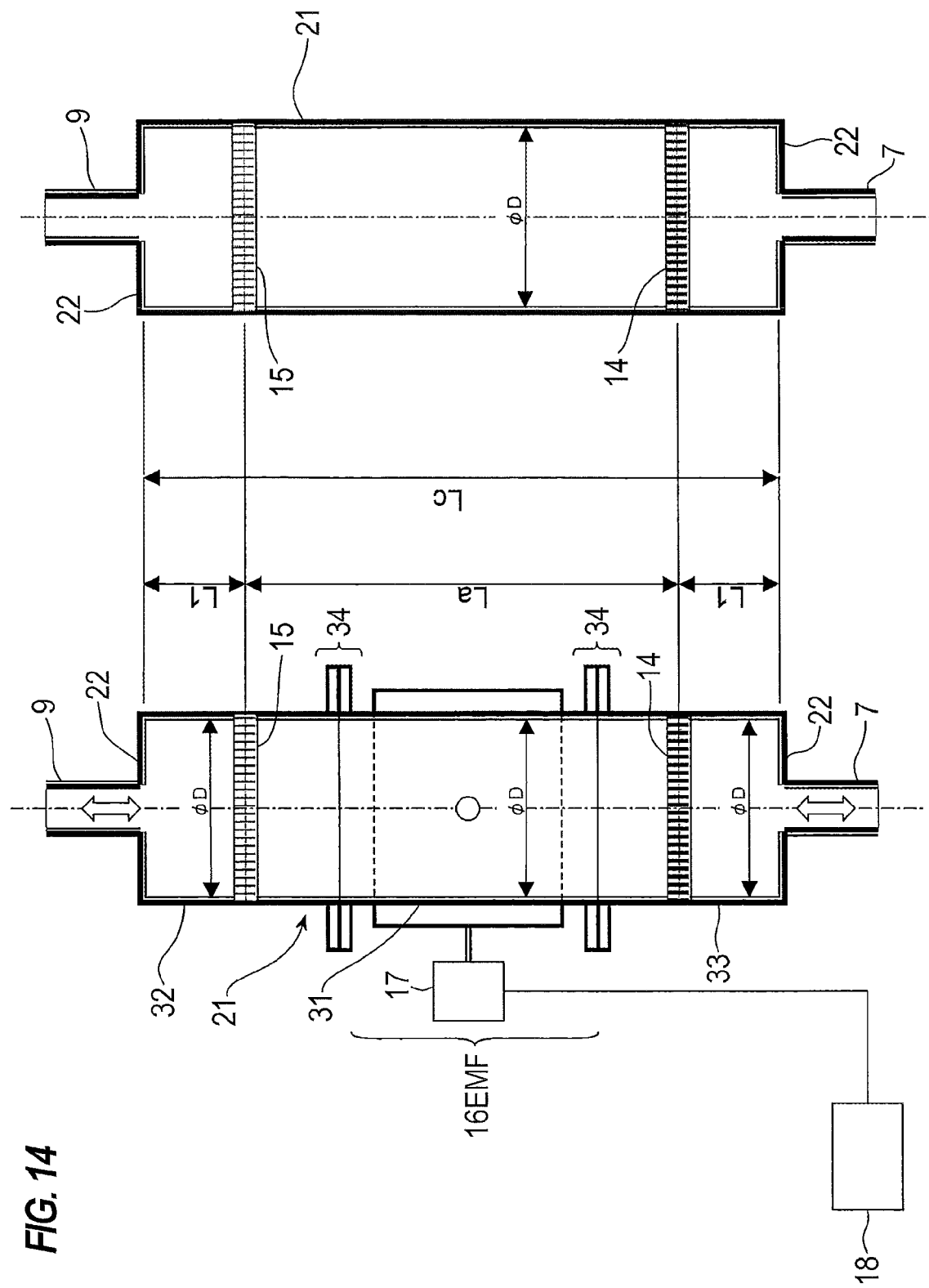
FIG. 14 is a view showing a pressure exchange chamber having an electromagnetic flowmeter and a pressure exchange chamber having no electromagnetic flowmeter in comparison.
Figure 15:
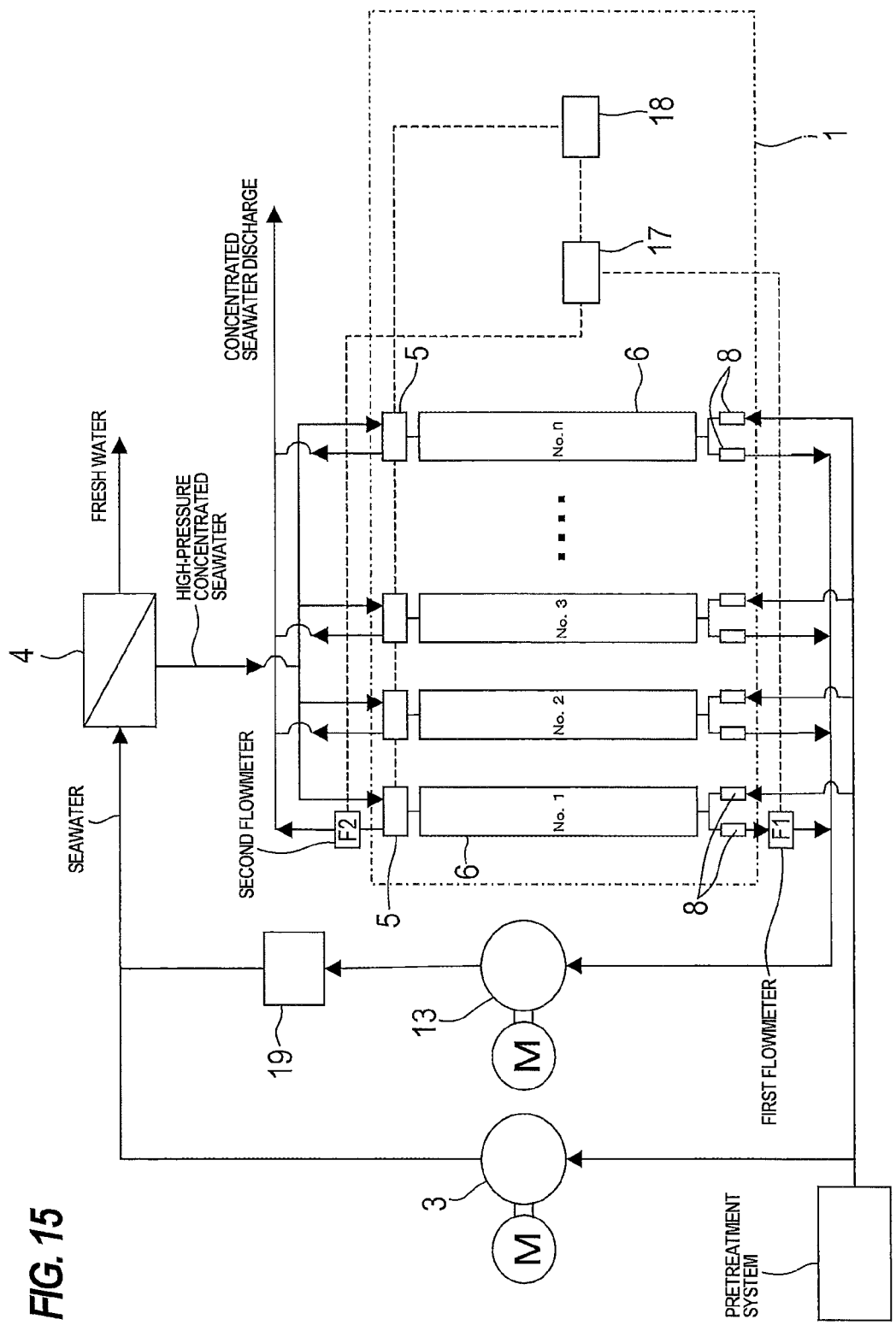
FIG. 15 is a schematic view showing an embodiment in which a plurality of pressure exchange chambers used have no piston, the interior shapes of the respective chambers are the same cylindrical shape, the seawater port and the concentrated seawater port are provided at end portions of the cylinder, and the flow resistors are provided at a certain distance from the respective end portions.
Figure 16:
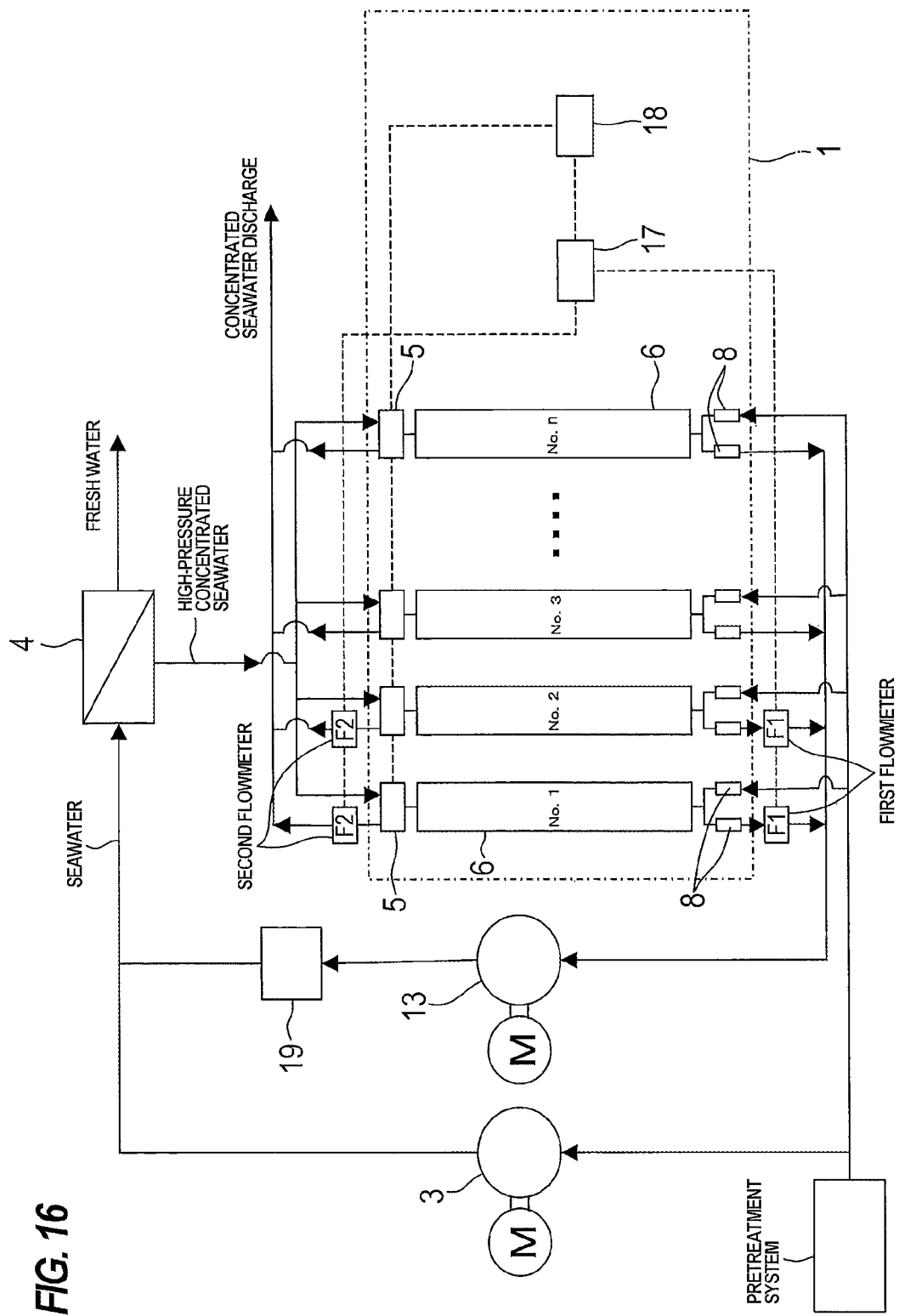
FIG. 16 is a schematic view showing an embodiment in which a plurality of pressure exchange chambers used have no piston, the interior shapes of the respective chambers are the same cylindrical shape, the seawater port and the concentrated seawater port are provided at end portions of the cylinder, and the flow resistors are provided at a certain distance from the respective end portions.
Figure 17:
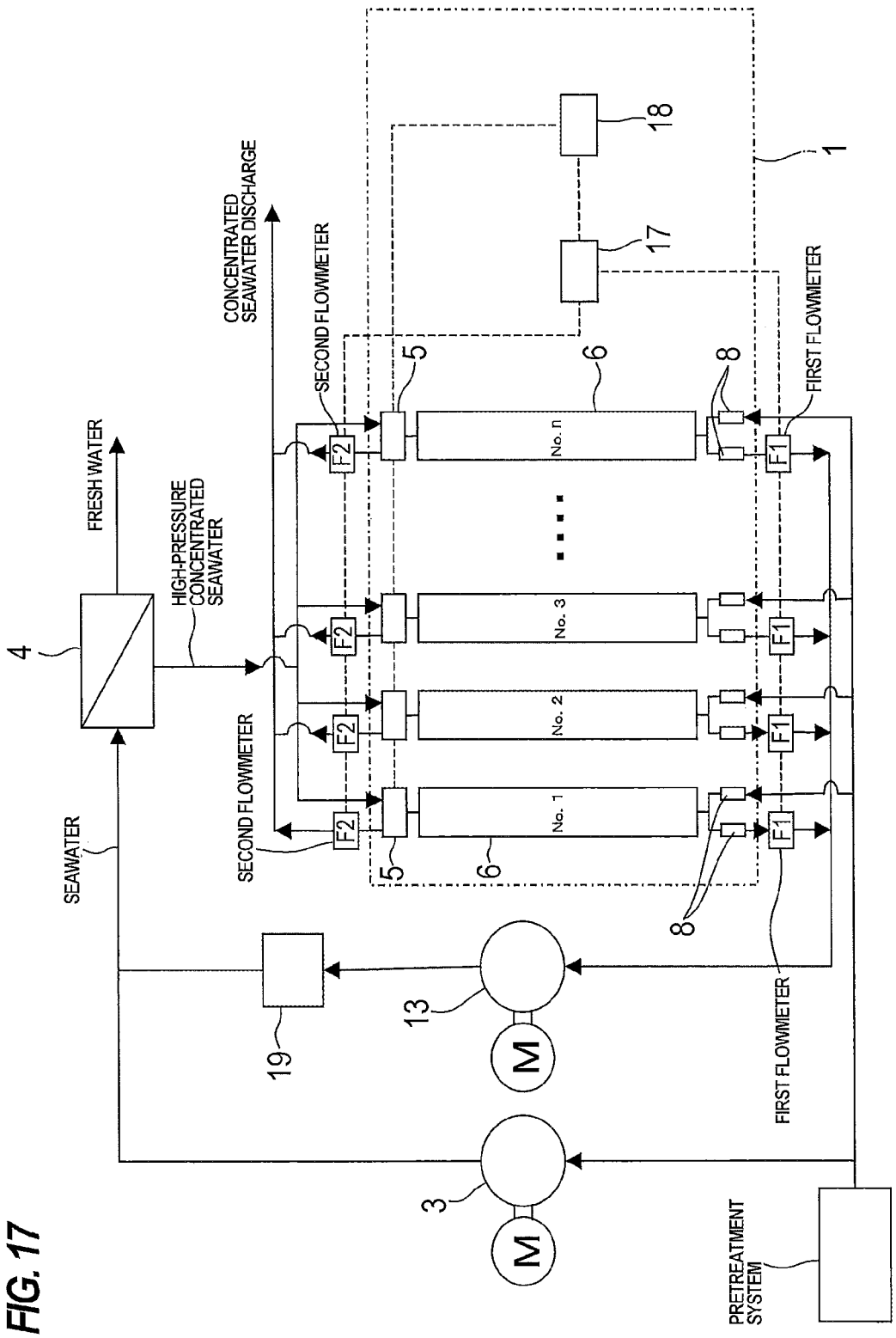
FIG. 17 is a schematic view showing an embodiment in which a plurality of pressure exchange chambers used have no piston, the interior shapes of the respective chambers are the same cylindrical shape, the seawater port and the concentrated seawater port are provided at end portions of the cylinder, and the flow resistors are provided at a certain distance from the respective end portions.
Figure 18:
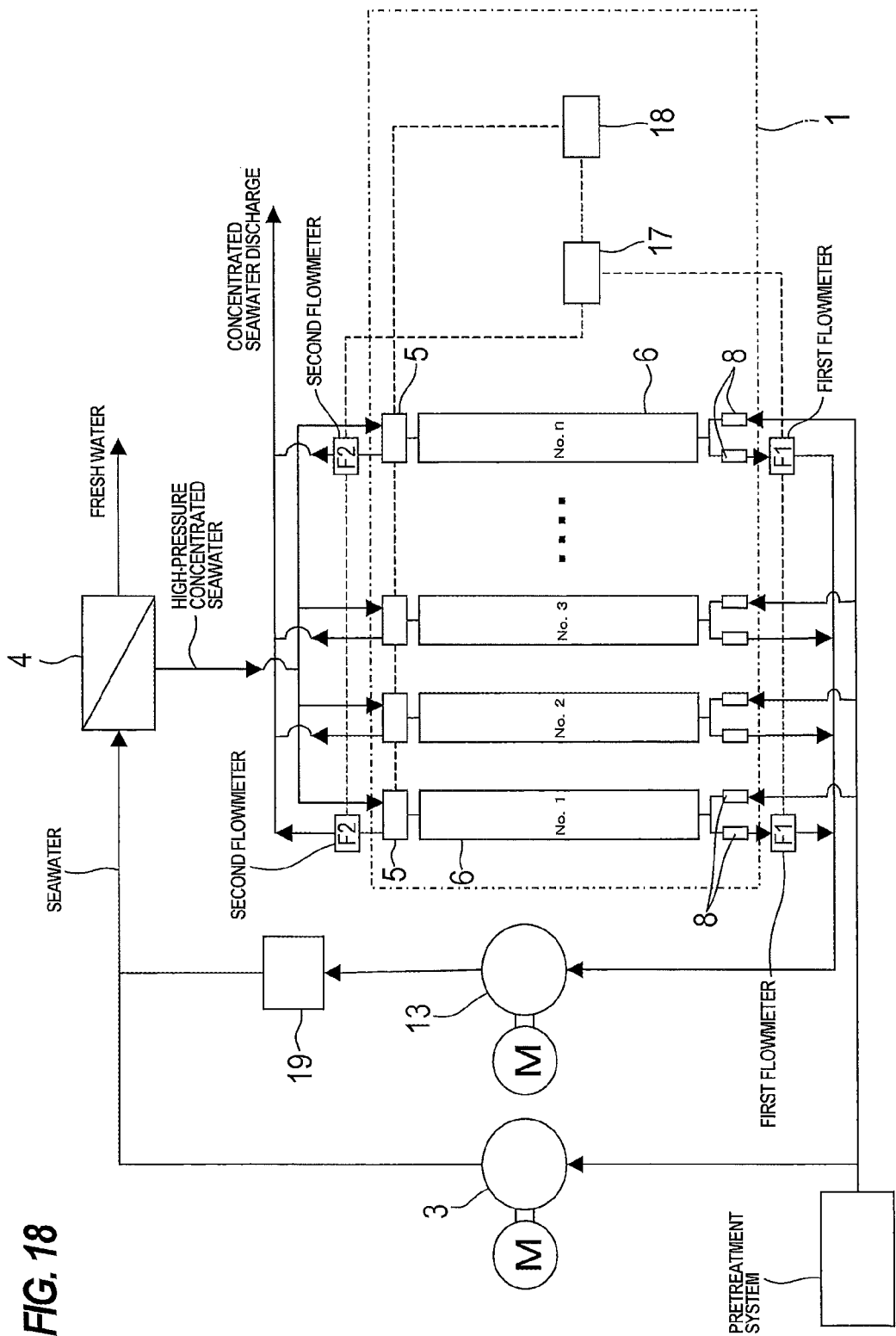
FIG. 18 is a schematic view showing an embodiment in which a plurality of pressure exchange chambers used have no piston, the interior shapes of the respective chambers are the same cylindrical shape, the seawater port and the concentrated seawater port are provided at end portions of the cylinder, and the flow resistors are provided at a certain distance from the respective end portions.
Figure 19:
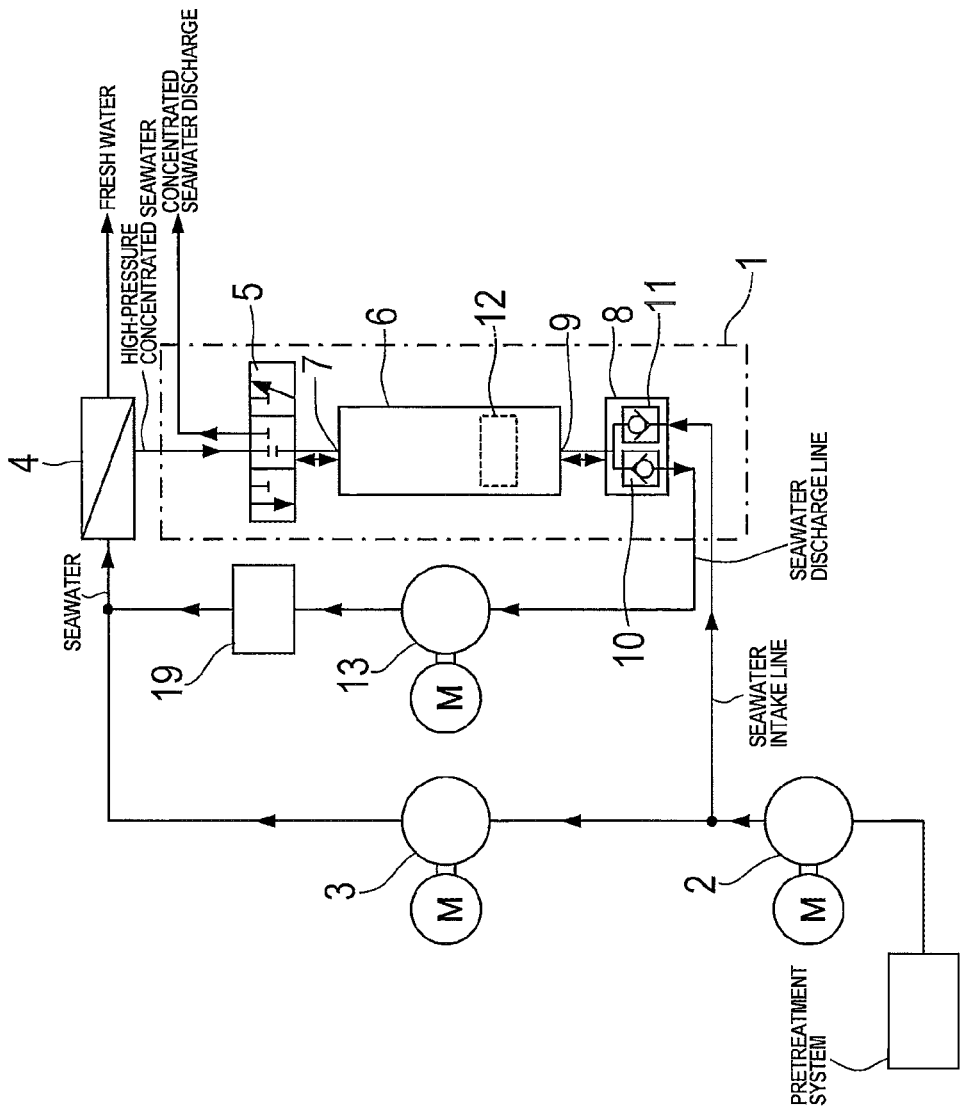
FIG. 19 is a schematic view showing a configuration example of a conventional seawater desalination system.

FIG. 14 is a schematic view showing a pressure exchange chamber having an electromagnetic flowmeter 16EMF and a pressure exchange chamber having no electromagnetic flowmeter in comparison. The standard pressure exchange chamber is shown on the right side of FIG. 14 and the pressure exchange chamber having the electromagnetic flowmeter is shown on the right side of FIG. 14, and both are shown in comparison. The standard pressure exchange chamber has a cylindrical shape having an inner diameter of $\varphi D$, and has an inside measure (inside length) of Lc in its longitudinal direction. The pressure exchange chambers 6 on the right and left sides of FIG. 14 comprise a long chamber body 21 having a cylindrical shape, and end plates 22, 22 for closing both opening ends of the chamber body 21, and have a hollow interior. A concentrated seawater port 7 is formed in one of the end plates 22 and a seawater port 9 is formed in the other of the end plates 22, and the seawater and the concentrated seawater are supplied to and discharged from the chamber through these ports. Flow resistors 14, 15 are disposed respectively at a distance L1 from each of the end surfaces.

The chamber body 21 of the pressure exchange chamber 6 in which the electromagnetic flowmeter 16EMF shown on the left side of the FIG. 14 is incorporated is divided into three pieces 31, 32, 33 for incorporating the electromagnetic flowmeter 16EMF therein. The first piece corresponds to the electromagnetic flowmeter 16EMF located at the central part of the chamber body 21. The flow passage itself of the electromagnetic flowmeter comprises a short pipe having an inner diameter of $\varphi D$ which constitute the cylindrical part of the pressure exchange chamber. Flanges 34 are provided at both end surfaces of the short pipe, and constitute an interface for introduction and discharge of the fluid to be measured. The electromagnetic flowmeter 16EMF applies a magnetic field to a direction perpendicular to a flow direction of the seawater or the concentrated seawater from the outer circumference of the short pipe, and measures a flow rate by measuring induced current generated in a direction perpendicular to the moving direction of the seawater or the concentrated seawater and the direction of the magnetic field due to movement of the seawater or the concentrated seawater. The control regarding measurement and external communication is performed by the sensor controller 17, and the information such as measuring conditions of the sensor controller 17 is transmitted to the device controller 18, thereby controlling the entire device.

The second piece 32 has the same shape and the same structure as the third piece 33. The second and third pieces 32 and 33 comprise a cylindrical short pipe having an inner diameter of $\varphi D$, and have one end covered with an end plate 22 having a port. In the second and third pieces 32 and 33, flow resistors 14 and 15 are disposed at the positions spaced by a distance L1 from the end surfaces of the respective end plates 22. A flange 34 is provided at another end portion of the short pipe, and thus the short pipe can be connected to the electromagnetic flowmeter 16EMF. Each of these second and third pieces 32 and 33 has a cap shape with a port, and is thus referred to as a cap with port.

As shown in FIG. 14, the three pieces are arranged such that the piece 31 constituting the electromagnetic flowmeter 16EMF is disposed in the center, and the two caps with ports 32, 33 are disposed so as to place the piece 31 therebetween and are connected to the piece 31 by the flanges 34, thereby constructing a pressure exchange chamber whose interior has a cylindrical shape. A seawater port 9 is formed in one end of the pressure exchange chamber and a concentrated seawater port 9 is formed in the other end of the pressure exchange chamber, and the interior shape of the pressure exchange chamber is the same as that of the standard pressure exchange chamber.

By such pressure exchange chamber having the electromagnetic flowmeter 16EMF, the same configuration as the embodiments shown in FIGS. 3 to 13 can be realized. Although the pressure exchange chamber needs to be high-pressure specification and corrosion-resistant specification, the pressure exchange chamber can maintain performance and function having high responsiveness and high accuracy as much as possible and can achieve the following four effects.

1) Since a single flowmeter is attached to the pressure exchange chamber, the measurement of the flow rate of the seawater and the measurement of the flow rate of the concentrated seawater can be shared by the single flowmeter. Since the measurement of the flow rate of the seawater and the measurement of the flow rate of the concentrated seawater can be shared, calibration and correction of the two flowmeters conventionally conducted become unnecessary. Further, in the case of the system comprising the plural chamber, it is sufficient to attach the flowmeter only to one pressure exchange chamber, and thus the number of flowmeters can be reduced.

2) Since the flowmeter which matches the shape of the standard pressure exchange chamber is attached, inspection and replacement of the flowmeter can be simple because the port portion of the pressure exchange chamber whose fluid passage becomes small can be attached or removed together with the chamber, without being removed from the large flange.

3) Since the flowmeter is attached to the pressure exchange chamber, the flowmeter as an attachment of a single body of the pressure exchange chamber and the flowmeter as a system comprising a plurality of pressure exchange chambers can be arranged in a compact manner.

4) The arrangement of the flowmeters as a system comprising a plurality of pressure exchange chambers becomes simple, maintenance of the system becomes simple, and the control of the switching valves of the plural pressure exchange chambers by the controller according to the detection information of the flowmeters becomes simple.

Further, part of operation and effect according to the embodiments shown in FIGS. 10 to 13 can be achieved by the configuration in which a plurality of pressure exchange chamber are provided, the internal shapes of the respective chambers have the same cylindrical shape, the seawater port and the concentrated seawater port are provided at the end portions of the cylinder, and the flow resistors are provided at the positions spaced by a certain distance from the respective end portions. Such configuration is shown in FIGS. 1, 14, etc. In the case of using such pressure exchange chamber, even if the pressure exchange chamber has no flowmeter, the flowmeter may be provided on the pipe for supply and discharge which is provided outside one pressure exchange chamber.

FIGS. 15 to 18 are schematic views showing embodiments in which a plurality of pressure exchange chambers 6 used have no piston, the interior shapes of the respective chambers are the same cylindrical shape, and the seawater port 9 and the concentrated seawater port 7 are provided at end portions of the cylinder, and the flow resistors 14 and 15 are provided at the positions spaced by a certain distance from the respective end portions. However, the flowmeters are provided in a line for discharging the seawater from the pressure exchange chamber and a line for discharging the concentrated seawater from the pressure exchange chamber as in the conventional art. Specifically, as shown in FIGS. 15 to 18, a first flowmeter F1 is provided in the line for discharging the seawater from the pressure exchange chamber 6 and a second flowmeter F2 is provided in the line for discharging the concentrated seawater from the pressure exchange chamber 6. With this configuration also, the embodiment shown in FIG. 15 as well as the embodiment shown in FIG. 10, the embodiment shown in FIG. 16 as well as the embodiment shown in FIG. 11, the embodiment shown in FIG. 17 as well as the embodiment shown in FIG. 12, the embodiment shown in FIG. 18 as well as the embodiment shown in FIG. 13, have the same operation, and can achieve a certain level of the same effect.

Therefore, there is no need for preparing large diameter electromagnetic flowmeters having pressure-resistant specification and corrosion-resistant specification in the collecting pipe of the seawater and the collecting pipe of the concentrated seawater. By flowmeters having small size so as to be attached to the line for discharging the seawater from the single body of the pressure exchange chamber and the line for discharging the concentrated seawater from the pressure exchange chamber, the flow rate can be measured and the operation control of all the pressure exchange chambers can be performed.

Furthermore, a plurality of pressure exchange chambers having no piston are provided, the internal shapes of the respective chambers have the same cylindrical shape, the seawater port and the concentrated seawater port are provided at the end portions of the cylinder, and the flow resistors are provided at the positions spaced by a certain distance from the respective end portions. This configuration can realize the embodiments shown in FIGS. 10 to 13 by detecting progress status of the seawater or the concentrated seawater in the single body of the pressure exchange chamber.

For example, if concentration or conductance switches are disposed in the vicinity of both end portions of a certain pressure exchange chamber and are configured to be on or off signal according to a change in concentration or electric conductivity in the chamber, the information of on and off signal is received by the sensor controller or the device controller, and the control of operation of the remaining pressure exchange chambers is performed. This configuration enables the operation in the embodiments shown in FIGS. 10 to 13. Further, there is no need for preparing large diameter electromagnetic flowmeters having pressure-resistant specification and corrosion-resistant specification at least in the collecting pipes of the seawater and the collecting pipes of the concentrated seawater. The operation control of other pressure exchange chambers can be performed according to moving condition of the seawater or the concentrated seawater in the pressure exchange chamber having the concentration switches.

Although the preferred embodiments of the present invention have been described above, it should be understood that the present invention is not limited to the above embodiments, but various changes and modifications may be made to the embodiments without departing from the scope of the appended claims.

INDUSTRIAL APPLICABILITY

The present invention is applicable to a seawater desalination system for desalinating seawater by removing salinity from the seawater and an energy recovery device which is preferably used in the seawater desalination system.

REFERENCE SIGNS LIST 1 energy recovery device
2 feed pump
3 high-pressure pump
4 reverse-osmosis membrane-separation apparatus
5 switching valve
6 pressure exchange chamber
7 concentrated seawater port
8 directional control valve
9 seawater port
10, 11 check valve
13 booster pump
14, 15 flow resistor
16 flowmeter (ultrasonic flowmeter)
16EMF electromagnetic flowmeter
17 sensor controller
18 device controller
19 valve
21 chamber body
22 end plate
23 cable
30 system controller
31, 32, 33 piece
34 flange
SH1, SH2 sensor head

What is claimed is:
1. A pressure exchange chamber for pressurizing seawater by a pressure of concentrated seawater discharged from a reverse-osmosis membrane-separation apparatus in a seawater desalination system for producing fresh water from the seawater by separating the seawater into fresh water and concentrated seawater by the reverse-osmosis membrane-separation apparatus, the pressure exchange chamber comprising:
  a first supply and discharge port provided at one end of the pressure exchange chamber and configured to perform supply and discharge of liquid, the first supply and discharge port being connected to a switching valve which is provided outside the pressure exchange chamber and is configured to supply a high-pressure or low-pressure liquid;
  a second supply and discharge port provided at the other end of the pressure exchange chamber and configured to perform supply and discharge of liquid, the second supply and discharge port being connected to a directional control valve which is provided outside the pressure exchange chamber and is configured to supply a high-pressure or low-pressure liquid;
  a flow resistor provided at the first supply and discharge port side in the pressure exchange chamber and configured to regulate the flow, and a flow resistor provided at the second supply and discharge port side in the pressure exchange chamber and configured to regulate the flow;
  a flowmeter provided between the two flow resistors and configured to measure a flow rate of the liquid in the pressure exchange chamber; and
  a device controller communicatively coupled to the flowmeter and configured to output an operational signal to the switching valve on the basis of measurements from the flowmeter to control the supply and discharge at the pressure exchange chamber.

2. An energy recovery device for pressurizing seawater by a pressure of concentrated seawater discharged from a reverse-osmosis membrane-separation apparatus in a seawater desalination system for producing fresh water from the seawater by separating the seawater into fresh water and concentrated seawater by the reverse-osmosis membrane-separation apparatus, the energy recovery device comprising:
- a plurality of pressure exchange chambers configured to convert a pressure of the concentrated seawater to a pressure of the seawater;
- a concentrated seawater port provided at one end of each of the plurality of pressure exchange chambers and configured to perform supply and discharge of the concentrated seawater, and a seawater port provided at the other end of each of the plurality of pressure exchange chambers and configured to perform supply and discharge of the seawater;
- a switching valve connected to the concentrated seawater port and configured to perform supply and discharge of high-pressure or low-pressure concentrated seawater, and a directional control valve connected to the seawater port and configured to perform supply and discharge of high--pressure or low-pressure seawater;
- a flowmeter provided in at least one of the plurality of pressure exchange chambers and configured to measure a flow rate or an integrated flow rate in the at least one of the plurality of pressure exchange chambers both when the seawater is supplied to the at least one of the plurality of pressure exchange chambers and when the seawater is discharged from the at least one of the plurality of pressure exchange chambers; and
- a device controller communicatively coupled to the flowmeter and configured to output an operational signal to the switching valve on the basis of measurements from the flowmeter to control the supply and discharge at the at least one of the plurality of pressure exchange chambers.

3. The energy recovery device according to claim 2, wherein a flow resistor configured to regulate the flow is provided at the concentrated seawater port side and a flow resistor configured to regulate the flow is provided at the seawater port side, and the flowmeter is provided between the two flow resistors.

4. The energy recovery device according to claim 2, wherein the flowmeter comprises an ultrasonic flowmeter which has a set of ultrasonic transmitter and receiver configured to measure a flow velocity or a flow rate in the at least one of the plurality of pressure exchange chambers from a cylindrical outer surface of the at least one of the plurality of pressure exchange chambers, and a sensor controller.

5. The energy recovery device according to claim 2, wherein the flowmeter comprises an electromagnetic flowmeter.

6. The energy recovery device according to claim 3, wherein the flow resistor comprises a circular plate member in which at least one hole is formed, and one or more flow resistors are provided respectively at the seawater port side and the concentrated seawater port side, and each of the one or more flow resistors are disposed such that a plate surface of each of the one or more flow resistors is parallel to a plane perpendicular to a cylindrical axis of each of the plurality of pressure exchange chambers.

7. An energy recovery device for pressurizing seawater by a pressure of concentrated seawater discharged from a reverse-osmosis membrane-separation apparatus in a seawater desalination system for producing fresh water from the seawater by separating the seawater into fresh water and concentrated seawater by the reverse-osmosis membrane-separation apparatus, the energy recovery device comprising:
- a plurality of pressure exchange chambers configured to convert a pressure of the concentrated seawater to a pressure of the seawater;
- a concentrated seawater port provided at one end of each of the plurality of pressure exchange chambers and configured to perform supply and discharge of the concentrated seawater, and a seawater port provided at the other end of each of the plurality of pressure exchange chambers and configured to perform supply and discharge of the seawater;
- a flow resistor provided at the concentrated seawater port side in each of the plurality of pressure exchange chambers and configured to regulate the flow and a flow resistor provided at the seawater port side in each of the plurality of pressure exchange chambers and configured to regulate the flow;
- a flowmeter provided in at least one of the plurality of pressure exchange chambers and between the two flow resistors and configured to measure a flow rate or an integrated flow rate of the seawater or the concentrated seawater in the at least one of the plurality of pressure exchange chambers;
- a switching valve connected to the concentrated seawater port and configured to perform supply and discharge of high-pressure or low-pressure concentrated seawater; and
- a device controller communicatively coupled to the flowmeter and configured to output an operational signal to the switching valve on the basis of measurements from the flowmeter to control the supply and discharge at the at least one of the plurality of pressure exchange chambers.

8. The energy recovery device according to claim 7, wherein the flowmeter comprises an ultrasonic flowmeter which has a set of ultrasonic transmitter and receiver configured to measure a flow velocity or a flow rate in the at least one of the plurality of pressure exchange chambers from a cylindrical outer surface of the at least one of the plurality of pressure exchange chambers, and a sensor controller.

9. The energy recovery device according to claim 7, wherein the flowmeter comprises an electromagnetic flowmeter.

10. The energy recovery device according to claim 7, wherein the flow resistor comprises a circular plate member in which at least one hole is formed, and one or more flow resistors are provided respectively at the seawater port side and the concentrated seawater port side, and each flow resistor is disposed such that a plate surface of each flow resistor is parallel to a plane perpendicular to a cylindrical axis of the respective pressure exchange chamber.

11. A seawater desalination system comprising:
- a feed pump configured to pressurize seawater;
- a high-pressure pump configured to pressurize the seawater discharged from the feed pump;
- a reverse-osmosis membrane-separation apparatus configured to separate the seawater pressurized by the high-pressure pump into fresh water and concentrated seawater;
- an energy recovery device having a plurality of pressure exchange chambers which are supplied with the seawater discharged from the feed pump, and pressurize and discharge the seawater by a pressure of the concentrated seawater;

a booster pump configured to pressurize the seawater discharged from the energy recovery device; and a plurality of switching valves each configured to switch supply of the concentrated seawater to one of the plurality of pressure exchange chambers and discharge of the concentrated seawater from one of the plurality of pressure exchange chambers;

wherein the energy recovery device comprises at least one pressure exchange chamber of the plurality of pressure exchange chambers which has a cylindrical shape having a space for containing the concentrated seawater and the seawater and having a cylindrical axis disposed vertically, a flowmeter provided in the at least one pressure exchange chamber and configured to measure a flow rate of the seawater and a flow rate of the concentrated seawater in the at least one pressure exchange chamber, and a device controller configured to output an operational signal to the respective switching valve on the basis of measuring information of the flowmeter; and a system controller which is a controller connected to the device controller and controls the feed pump, the high-pressure pump and the booster pump.

12. A method for controlling a seawater desalination system configured to produce fresh water from seawater by separating the seawater into fresh water and concentrated seawater with a reverse-osmosis membrane-separation apparatus, the method comprising:

a first step for supplying the high-pressure concentrated seawater from one end side of a pressure exchange chamber of an energy recovery device, and moving the seawater toward an end surface of the opposite side of the pressure exchange chamber while pressurizing the seawater contained in the pressure exchange chamber;

a second step for supplying the seawater from the end surface of the opposite side of the pressure exchange chamber, and moving the concentrated seawater contained in the pressure exchange chamber toward the one end side of the pressure exchange chamber;

wherein in the first and second steps, the seawater and the concentrated seawater moving in the pressure exchange chamber pass through respective flow resistors provided in the pressure exchange chamber to regulate the flow of the seawater and the flow of the concentrated seawater, and then the seawater and the concentrated seawater pass respectively through a flowmeter provided in the pressure exchange chamber to measure a flow velocity or a flow rate or an integrated flow rate; and the flow rates of supply and discharge of the seawater and the concentrated seawater to the pressure exchange chamber are controlled on the basis of the measured values obtained by the measurement by a device controller communicatively coupled to the flowmeter.

13. The method for controlling a seawater desalination system according to claim 12, wherein a plurality of the pressure exchange chambers whose internal shapes are the same shape are provided, the flowmeter is provided in at least one of the pressure exchange chambers, and supply and discharge of the concentrated seawater and the seawater to another pressure exchange chamber or other pressure exchange chambers is controlled on the basis of the measured value of the flowmeter.

14. The method for controlling a seawater desalination system according to claim 12, wherein the supply amount of the seawater to the pressure exchange chamber and the discharge amount of the seawater pressurized and pushed out by the concentrated seawater are calculated; and on the basis of the calculation result, operational signals for determining supply and discharge time by the switching valve and opening of the switching valve for adjusting the supply amount and the discharge amount are generated to control the supply amount and the discharge amount.

* * * * *